United States Patent
Pajovic et al.

(10) Patent No.: US 11,347,238 B2
(45) Date of Patent: May 31, 2022

(54) SYSTEM AND METHOD FOR PROBABILISTIC MULTI-ROBOT SLAM

(71) Applicant: Mitsubishi Electric Research Laboratories, Inc., Cambridge, MA (US)

(72) Inventors: Milutin Pajovic, Cambridge, MA (US); Nathaniel Moore Glaser, Atlanta, GA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 195 days.

(21) Appl. No.: 16/591,437

(22) Filed: Oct. 2, 2019

(65) Prior Publication Data

US 2021/0103290 A1 Apr. 8, 2021

(51) Int. Cl.
*G05D 1/02* (2020.01)
*B25J 9/16* (2006.01)
(Continued)

(52) U.S. Cl.
CPC .......... *G05D 1/0274* (2013.01); *B25J 9/1682* (2013.01); *G05D 1/0246* (2013.01);
(Continued)

(58) Field of Classification Search
CPC .. G05D 1/0274; G05D 1/0246; G05D 1/0287; G05D 1/0291; G05D 1/0272;
(Continued)

(56) References Cited

U.S. PATENT DOCUMENTS

| | | | |
|---|---|---|---|
| 8,209,143 B1 * | 6/2012 | Anguelov | G01C 15/00 702/150 |
| 2008/0119961 A1 * | 5/2008 | Myeong | G05D 1/0274 700/262 |

(Continued)

FOREIGN PATENT DOCUMENTS

CN 103914069 7/2014

OTHER PUBLICATIONS

Carlone et al., "Rao-Blackwellized Particle Filters Multi Robot SLAM with Unknown Initial Correspondences and Limited Communication." https://www.researchgate.net/publication/221073862 Conference Paper in Proceedings—IEEE International Conference on Robotics and Automation May 2010 DOI: 10.1109/OBOT.2010.5509307 • Source DBLP.

(Continued)

*Primary Examiner* — Robert T Nguyen
*Assistant Examiner* — Dylan M Katz
(74) *Attorney, Agent, or Firm* — Gennadiy Vinokur; Hironori Tsukamoto

(57) ABSTRACT

A robot performs simultaneous localization and mapping (SLAM) using a particle filter to process sensor measurements of movements of the robot in an environment and occupied locations in the environment to produce a set of particles. Each particle includes a map of the environment and a pose of the robot in the environment to represent a probability that the environment has the map oriented with respect to the pose of the robot. The robot receives a set of particles of a neighboring robot and, in response to receiving the set of particles of the neighboring robot, updates maps of probabilistically sampled particles of the robot with maps of probabilistically sampled particles of the neighboring robot. The update includes merging a map of the sampled particle of the robot with a map of the sampled particle of the
(Continued)

neighboring robot roto-translated based on a relative pose between the robots.

20 Claims, 21 Drawing Sheets

(51) Int. Cl.
    *G06F 17/18*     (2006.01)
    *G01C 21/20*     (2006.01)
    *G01C 21/30*     (2006.01)

(52) U.S. Cl.
    CPC ........... *G05D 1/0287* (2013.01); *G06F 17/18* (2013.01); *G01C 21/206* (2013.01); *G01C 21/30* (2013.01); *G05D 1/0272* (2013.01); *G05D 1/0291* (2013.01)

(58) Field of Classification Search
    CPC ...... B25J 9/1682; G06F 17/18; G01C 21/206; G01C 21/30; G01C 21/383; G01C 21/3841; G01C 21/3893
    See application file for complete search history.

(56) References Cited

U.S. PATENT DOCUMENTS

| 2016/0378117 | A1* | 12/2016 | Szatmary | G01S 7/51 |
| | | | | 382/153 |
| 2019/0030719 | A1* | 1/2019 | Dey | G05D 1/0295 |
| 2019/0224843 | A1* | 7/2019 | Yang | B25J 19/02 |

OTHER PUBLICATIONS

Chen et al., "Localization for Multirobot Formations in Indoor Environment." IEEE ASME Transactions on Mechatronics. vol. 15, No. 4, Aug. 2010. pp 561-574.

\* cited by examiner

SYSTEM AND METHOD FOR PROBABILISTIC MULTI-ROBOT SLAM

TECHNICAL FIELD

The invention relates generally to a mobile robot, and, more particularly, to probabilistic multi-robot simultaneous localization and mapping (SLAM).

BACKGROUND

In robotic mapping, simultaneous localization and mapping (SLAM) is the computational problem of constructing or updating a map and/or a model of an unknown environment while simultaneously keeping track of an agent's location within the environment. While SLAM relates to the building of a map (mapping) and the use of the map (localization), a process associated with localization and a process associated with mapping need not actually be performed simultaneously for a system to perform SLAM. For example, procedures can be performed in a multiplexed fashion.

A general problem of robot SLAM comprises of mapping an unknown area and estimating pose of a robot based on measurements from its sensors, such as odometry, and sensors providing environment measurements (visual camera, depth camera, lidar, etc) and, possibly, some external information. The robot mapping and positioning is at the core of nearly all robotics applications.

Single robot SLAM has received tremendous attention with numerous systems, algorithms and use cases. Recently, the scenario where multiple robots collaboratively perform SLAM started to gain interest. A naïve approach in multi-robot SLAM is to have each robot perform a single-robot SLAM, independent of each other. However, since the robots are already enabled to exchange information with the aim to cooperatively execute some task, the robots can cooperatively perform SLAM as well. That is, each robot may perform SLAM using not only its own odometry and environment measurements, but also information received from other robots. The advantages of this approach may include better performance, faster convergence, and robustness. However, the amount of measurements collected by the robots may be prohibitively large for the exchange in multi-robot SLAM. In addition, the computation required for reevaluating SLAM estimation of the robot based on measurements of another robot can be expensive for embedded processors of the robots. See, e.g., L. Carlone, M. K. Ng, J. Du, B. Bona, M. Indri, "Rao-Blackwellized Particle Filters Multi Robot SLAM with Unknown Initial Correspondences and Limited Communication", ICRA, May 2010. Accordingly, there is a need to improve efficiency of multi-robot SLAM.

SUMMARY

It is an objective of some embodiments to provide a probabilistic multi-robot simultaneous localization and mapping (SLAM) using a particle filter. Particle filter represents a pose of a robot and a map of an environment using a set of particles. The pose of a robot includes one or combination of location and orientation of the robot. Each particle defines a probability of a value of the map of the environment and the current pose of the robot in the environment.

Each robot in a multi-robot SLAM setting performs a single-robot SLAM until two robots come relatively close to each other such that at least one of the robots detects the presence of the other robot. The single-robot SLAM is based on odometry and ranging-based measurements, fused in the Bayesian inference framework using particle filter, such that robot's map and pose in the map are represented with a number of particles, where each particle is a pair of a possible realization of map and robot's pose in that map. Upon the encounter, the robots measure their relative pose, and wirelessly exchange information indicative of SLAM.

Some embodiments are based on recognition that the robots can exchange all odometry and ranging measurements they have collected up until the encounter. In this case, the multi-robot SLAM can fuse the measurements of both robots and the relative pose measurements in the Bayesian framework, which can be implemented by means of particle filtering. However, the main issue with this approach is that the robots are required to exchange all measurements and then process them. This, in turn, leads to (1) increased communication bandwidth requirement, (2) increased computational complexity of processing in each robot because the measurements received from the other robot need to be processed, (3) increased memory requirements in each robot because the measurements received from the other robot need to be stored and (4) less flexibility for cooperative SLAM over heterogeneous robot platforms because each robot needs to be supplied with information on other robots' sensors so that it can process measurements obtained from other robots.

To that end, it is an object of some embodiments to overcome the requirement that robots exchange all measurements at their encounters so as to make multi-robot SLAM more practical. Specifically, some embodiments disclose a probabilistic multi-robot SLAM wherein robots exchange their particles upon a rendezvous. Notably, this approach does not require raw measurements of the sensors of each robot to be stored and exchanged at a rendezvous. Advantageously, each robot can fuse measurements of its corresponding sensor as soon as it gets them into updated particles that represent its pose and a map of the environment. At the rendezvous, robots exchange particles leading to a relatively mild requirement on communication bandwidth size. In addition, this approach allows to establish connection only when the robots come in proximity, e.g., in line of sight of each other. This allows to alleviate a requirement on communication coverage that can be achieved with a low power transceiver, such as those implementing Bluetooth standard.

It is another objective of some embodiments to provide such a probabilistic multi-robot positioning method that reduce a computational complexity, while ensuring performance guarantees provided by probabilistic estimation.

Some embodiments are based on realization that a particle filter solves a Bayesian inference problem, thus the multi-robot SLAM fusion should also follow the principles of Bayesian inference to guarantee the performance of the particle filter. However, the comparison of particles of different robots is pairwise, i.e., particles are grouped in pairs and two particles of each pair are compared with each other to update a pose of a robot. However, when pairing the particles is deterministic, such a pairing can undermine performance guaranties provided by Bayesian inference.

For example, all particles of one robot can be compared with all particles of another robot. Such an exhaustive pairing is deterministic, but accidently follows the principles of Bayesian inference when all information of hypotheses is available for probability estimation. However, such a comparison results in computational complexity $O(K^2)$, where K is the number of particles. A deterministic attempt to deviate from exhaustive pairing violates the principles of Bayesian inference. For example, ad-hoc clustering and comparison of particles of each cluster can reduce the computational complexity, but violates the principles of Bayesian inference, because clustering is deterministic.

Some embodiments are based on realization that probabilistic sampling and pairing of particles of different robots during probabilistic multi-robot positioning can reduce computational complexity to O(K), where K is the number of randomly selected pairs of particles while ensuring the probabilistic guarantees of particle filter. Indeed, probabilistic sampling follows the principles of Bayesian inference to guarantee performance of the particle filter. In addition, probabilistic sampling is also simple, computationally efficient, and suitable for parallel computing.

To that end, some embodiments, upon rendezvous of a robot with another neighbor robot, update maps of probabilistically sampled particles of the robot with maps of probabilistically sampled particles of the neighboring robot, wherein the update includes merging a map of the sampled particle of the robot with a map of the sampled particle of the neighboring robot roto-translated based on a relative pose between the robot and the neighboring robot. As used herein, probabilistically sample particles are sampled with some probability, i.e., not deterministically. Such a probabilistic sampling can be implemented using any random and/or a pseudo-random generator configured to select numbers from a set of numbers with equal probability, such that any number is equally likely to be selected from the set. In different implementations, particles are randomly sampled, uniformly or non-uniformly according to particle weights, such as a particle with a larger weight is more likely to be sampled than a particle with a smaller weight.

Accordingly, one embodiment discloses a robot for performing simultaneous localization and mapping (SLAM), including a set of sensors for measuring movements of the robot in an environment and sensing occupied locations in the environment to produce sensor measurements; a processor configured to execute a SLAM module that processes the sensor measurements by a particle filter to produce a set of particles, each particle including a map of the environment and a pose of the robot in the environment to represent a probability that the environment has the map oriented with respect to the pose of the robot; a receiver configured to receive a set of particles of a neighboring robot, wherein the processor, in response to receiving the set of particles of the neighboring robot, is configured to update maps of probabilistically sampled particles of the robot with maps of probabilistically sampled particles of the neighboring robot, wherein the update includes merging a map of the sampled particle of the robot with a map of the sampled particle of the neighboring robot roto-translated based on a relative pose between the robot and the neighboring robot; and an output interface configured to output one or combination of a current map of the robot and a current pose of the robot in the current map determined based on the particles of the robot.

Another embodiment discloses a method for performing simultaneous localization and mapping (SLAM), wherein the method uses a processor coupled with stored instructions implementing the method, wherein the instructions, when executed by the processor carry out steps of the method, includes measuring movements of the robot in an environment and sensing occupied locations in the environment to produce sensor measurements; processing the sensor measurements by a particle filter to produce a set of particles, each particle including a map of the environment and a pose of the robot in the environment to represent a probability that the environment has the map oriented with respect to the pose of the robot; receiving a set of particles of a neighboring robot and updating, in response to receiving the set of particles of the neighboring robot, maps of probabilistically sampled particles of the robot with maps of probabilistically sampled particles of the neighboring robot, wherein the updating includes merging a map of the sampled particle of the robot with a map of the sampled particle of the neighboring robot roto-translated based on a relative pose between the robot and the neighboring robot; and outputting one or combination of a current map of the robot and a current pose of the robot in the current map determined based on the particles of the robot.

Yet another embodiment discloses a non-transitory computer readable storage medium embodied thereon a program executable by a processor for performing a method. The method includes measuring movements of the robot in an environment and sensing occupied locations in the environment to produce sensor measurements; processing the sensor measurements by a particle filter to produce a set of particles, each particle including a map of the environment and a pose of the robot in the environment to represent a probability that the environment has the map oriented with respect to the pose of the robot; receiving a set of particles of a neighboring robot and updating, in response to receiving the set of particles of the neighboring robot, maps of probabilistically sampled particles of the robot with maps of probabilistically sampled particles of the neighboring robot, wherein the updating includes merging a map of the sampled particle of the robot with a map of the sampled particle of the neighboring robot roto-translated based on a relative pose between the robot and the neighboring robot; and outputting one or combination of a current map of the robot and a current pose of the robot in the current map determined based on the particles of the robot.

DETAILED DESCRIPTION

Figure 1A:
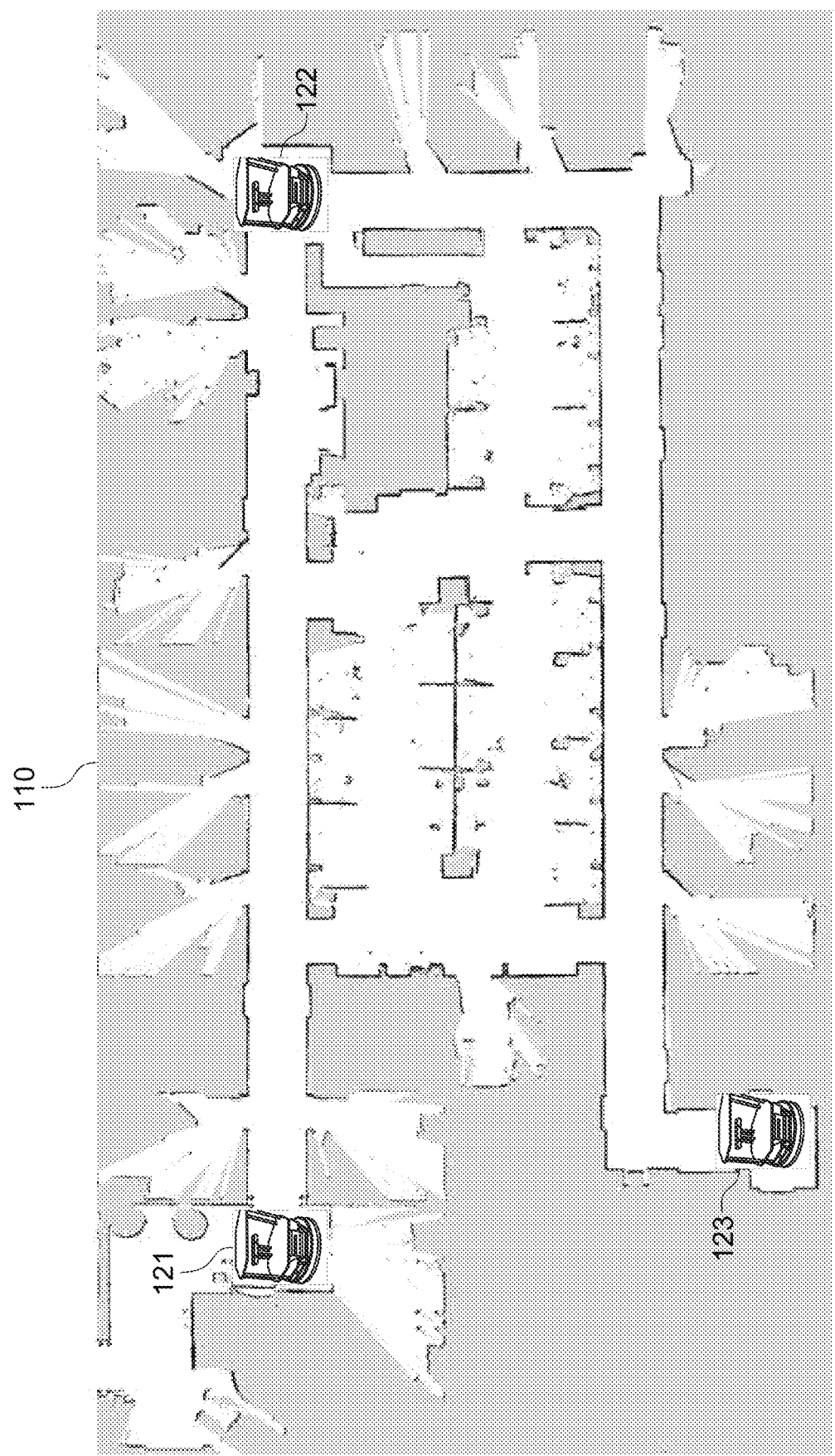
FIG. 1A shows a schematic illustrating a scenario where multiple robots travel in an indoor area to perform multi-robot positioning according to some embodiments.

FIG. 1A shows a schematic illustrating a scenario where multiple robots travel in an indoor area to perform multi-robot positioning according to some embodiments. In one embodiment, 2D occupancy grid map is known and/or made available to the robots. Additionally, or alternatively, some embodiments perform simultaneous localization and mapping (SLAM) by constructing or updating a map of an unknown environment while simultaneously keeping track of robot's poses.

In an example shown in FIG. 1A, three robots 121, 122 and 123 are in common area 110 and cooperatively execute a certain task. One of the main prerequisites for a successful task execution is to enable robots the ability to perform SLAM that includes simultaneously estimating unknown map of the environment and localizing themselves in the estimated map. In other words, the robots need to estimate map 110 and each needs to estimate its own location and orientation 121, 122, 123 in the map. A naive approach is to let each robot perform SLAM on its own using a single-robot SLAM algorithms from prior art. However, robots may cooperate while performing SLAM with the potential benefit of obtaining more accurate estimates of the environment's map and their location in the map. This invention discloses methods for multi-robot cooperative and distributed SLAM.

A robot is a fully or partially autonomous entity containing motor so that it can autonomously move in an area, set of sensors to take a variety of measurements, memory to store measurements and other quantities, processor to execute a variety of algorithms, transceiver to communicate with other robots and devices, and a battery which supplies electric power to the robot and its sub-systems.

Each robot is equipped with a sensor for environment sensing, such as a low-cost structured light sensor, and a sensor for recording robot's motions, such as an odometric sensor. To enable cooperation, robots need to be able to detect the presence of other robots. This could be achieved in multiple ways. For example, in one embodiment, a checkerboard is placed on one robot, while the other robot is equipped with a visual camera to detect the presence of the checkerboard and measure the relative pose between robots (i.e., relative range, bearing and heading).

The robots are assumed to move in an area, either by random wander or according to some instructions, and occasionally come relatively close to each other. Once the encounter, also called rendezvous, is detected by one or both robots, the robots exchange a relatively small amount of information via a wireless communication link. Each robot fuses the received information with its own information locally, using its own computational resources. In other words, the information fusion happens at each robot independently, so that a central server is not needed.

More specifically, each robot traveling in an area performs a single-robot SLAM on its own using measurements from environment and motion sensing. The map and path/location estimates are obtained using a conventional single-robot particle filter (PF)-based SLAM algorithm and represented with a certain number of particles. Upon the encounter, the two robots exchange their particles. This is in contrast with most approaches in multi-robot SLAM, where robots exchange all environment and motion measurements collected between two consecutive encounters. In addition to particles, the robot measuring the relative pose between robots sends that measurement to the other robot. Each robot then fuses particles representing its map and pose prior to the encounter with the other robot, with the particles received from the other robot and relative pose measurement between the two robots. The result of the information fusion, done locally on each robot, is a set of updated particles. The robots then continue to travel in the area and perform SLAM on their own until they encounter each other again.

Figure 1B:
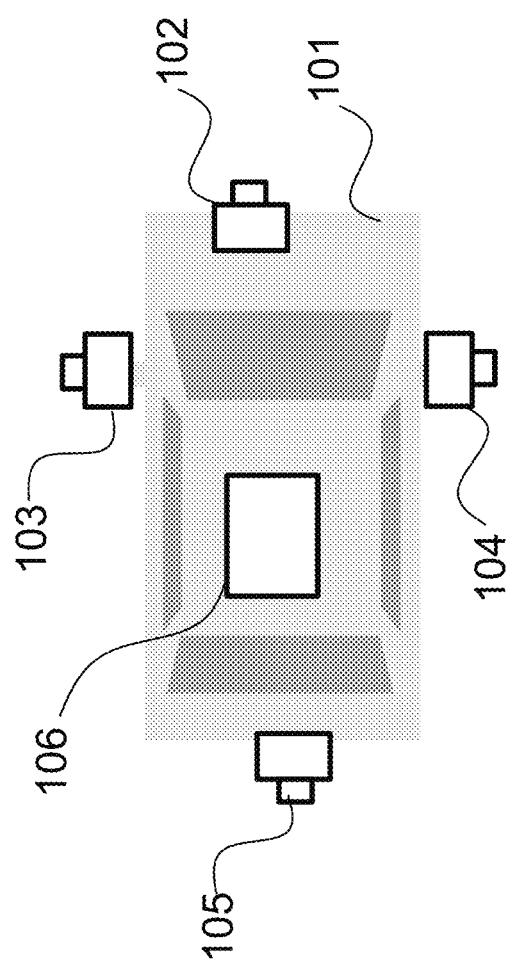
FIG. 1B shows a schematic of a robot utilizing cooperative SLAM using principles of some embodiments.
Figure 1C:
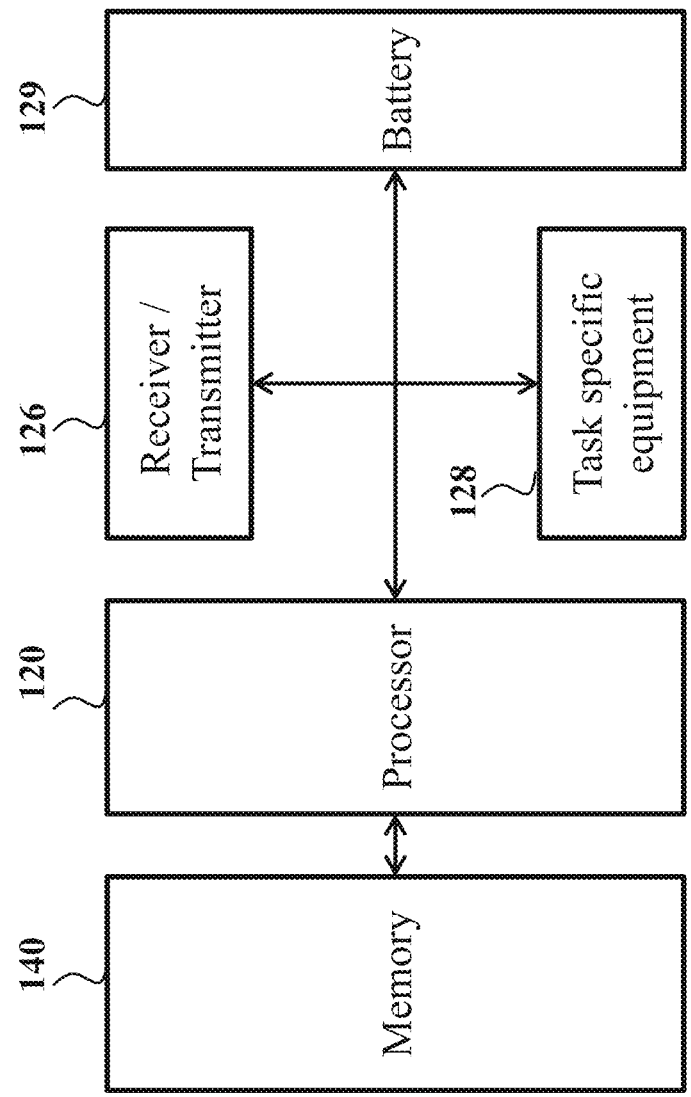
FIG. 1C shows a schematic of various components of the robot of FIG. 1B.

FIG. 1B shows a schematic of a robot utilizing cooperative SLAM using principles of some embodiments. FIG. 1C shows a schematic of various components of the robot of FIG. 1B. A robot is a fully or partially autonomous entity containing motor 106 so that it can autonomously move in an area, set of sensors 102, 103, 104, and 105 to take a variety of measurements, memory 140 to store measurements and other quantities, processor 120 to execute a variety of algorithms, transceiver 126, i.e., a receiver and a transmitter, to communicate with other robots and devices, and a battery 129 which provides electric power to the robot and all its devices. The robot may also include equipment 128, e.g., a gripper, for performing various tasks of the robot.

For example, a robot is equipped with a sensor for environment sensing, such as a low-cost structured light sensor, and a sensor for recording robot's motions, such as odometric sensors. To enable cooperation, robots need to be able to detect the presence of other robots. This could be achieved in multiple ways. For example, in one scenario, a facial of a robot is marked with visible markings, while the other robot is equipped with a visual camera to detect the presence of the checkerboard and measure the relative pose between robots (i.e., relative range, bearing and heading).

The robots are configured to move in an area, either by random wander or according to some instructions, and occasionally come relatively close to each other. Once the rendezvous is detected by one or both robots, the robots exchange a relatively small amount of information via a wireless communication link. Each robot fuses the received information with its own information locally, using its own computational resources. In other words, the information fusion happens at each robot independently, so that a central server is not needed.

More specifically, each robot traveling in an area localizes itself in the map of that area using measurements from environment and motion sensing. The location estimate is obtained using a single-robot PF-based positioning and represented with a certain number of pose particles. Upon the rendezvous, the two robots exchange their particles. This is in contrast with other multi-robot SLAM, where robots exchange all environment and motion measurements collected between two consecutive rendezvous events. In addition to particles, the robot measuring the relative pose between robots sends that measurement to the other robot. Each robot then fuses particles representing its pose prior to the rendezvous, with the particles received from the other robot and relative pose measurement between the two robots. The result of the information fusion done locally on each robot is a set of updated pose particles. The robots then continue to travel in the area and perform pose estimation on their own until they meet again.

Some embodiments, upon rendezvous of a robot with another neighbor robot, compare probabilistically paired particles of the robots to update the maps of the particles. As used herein, probabilistically paired particles are sampled probabilistically, i.e., not deterministically. Such a probabilistical paring can be implemented using any random and/or a pseudo-random generator configured to select numbers from a set of numbers with equal probability, such that any number is equally likely to be selected from the set. In different implementations, particles are sampled uniformly randomly or non-uniformly randomly according to weights of the particle, such that a particle with a larger weight is more likely to be sampled than a particle with a smaller weight.

Figure 1D:
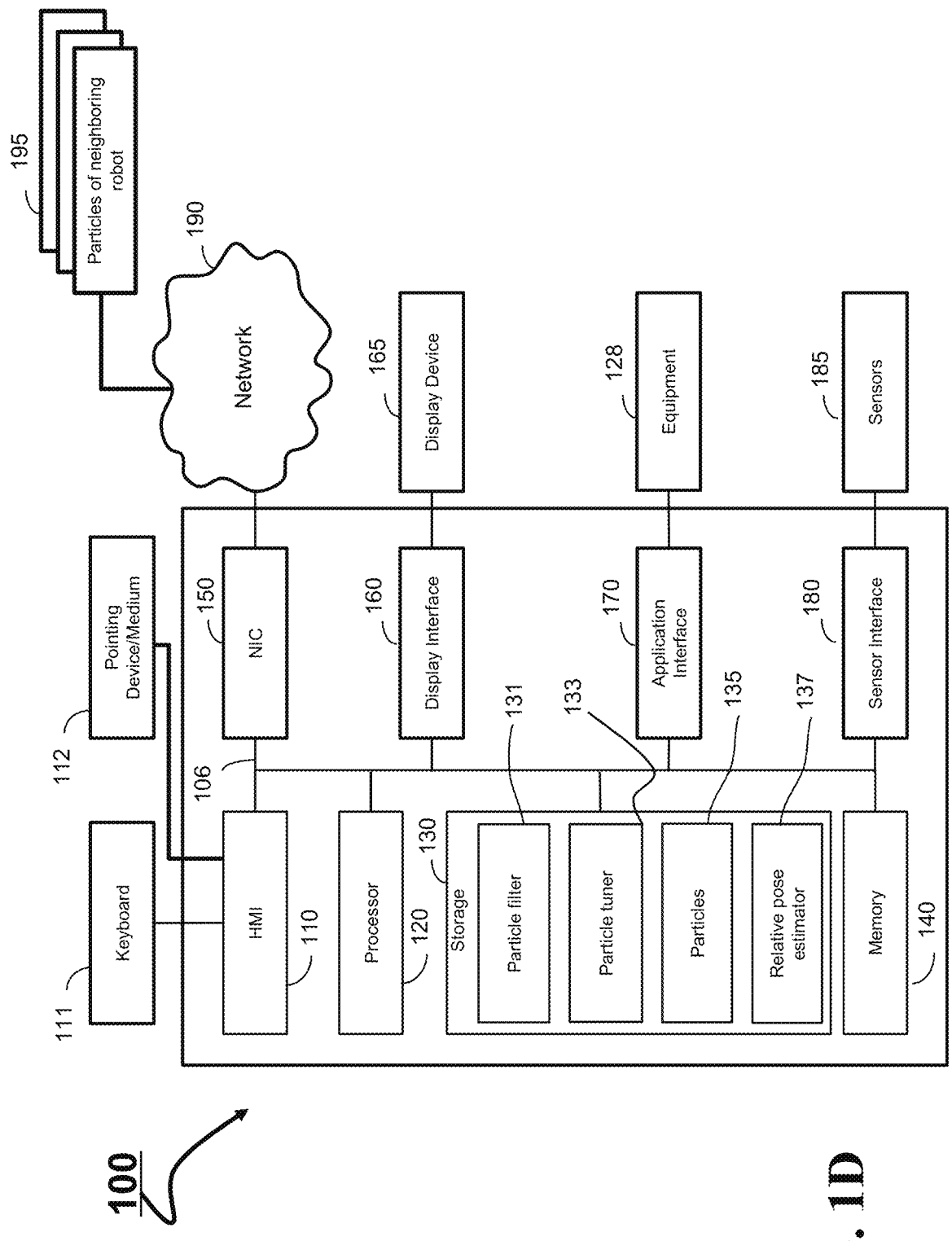
FIG. 1D shows a block diagram of a system 100 for performing a multi-robot SLAM in accordance with some embodiments.

FIG. 1D shows a block diagram of a system 100 for performing a multi-robot SLAM in accordance with some embodiments. As used herein, the pose includes one or combination of a location of the robot and an orientation of the robot. The map of the environment can be rendered in a number of different ways, e.g., that as occupancy grid points. The system 100 implements a probabilistic multi-robot SLAM method that reduce a computational complexity, while ensuring performance guarantees provided by probabilistic estimation.

The system 100 includes a processor 120 configured to execute stored instructions, as well as a memory 140 that stores instructions that are executable by the processor. The processor 120 can be a single core processor, a multi-core processor, a computing cluster, or any number of other configurations. The memory 140 can include random access memory (RAM), read only memory (ROM), flash memory, or any other suitable memory systems. The processor 120 is connected through a bus 106 to one or more input and output devices. These instructions implement a method for probabilistic multi-robot SLAM.

To that end, the system 100 includes a particle filter 131 configured to process sensor measurements to produce a set of particles. Each particle includes a map of the environment and a pose of the robot to represent a probability that the environment has occupancy grid points of the map of the particle oriented with respect to the pose of the robot. In other words, each particle defines a probability of a value of the current pose of the robot and the map of the environment. The particles can be determined and/or updated using measurements of the sensors of the robot. The particles represent pose with respect to the measurements of the sensors. This allows the robot to avoid storing raw measurements of the sensor, and store only the particles 135, which is memory efficient. For example, a storage device 130 can be adapted to store the particles 135 and/or the particles of other neighboring robots. The storage device 130 can be implemented using a hard drive, an optical drive, a thumb drive, an array of drives, or any combinations thereof.

In some implementations, the particle filter 131 can update the SLAM particles of the robot using only the measurements of the sensors of the robot. However, the system 100 also includes a particle tuner 133 configured to update the particles 135 using external information, i.e., other and/or in addition to the robot's sensors measurements. Specifically, particle tuner 133, in response to receiving the set of particles of the neighboring robot, is configured to update maps of probabilistically sampled particles of the robot with maps of probabilistically sampled particles of the neighboring robot, wherein the update includes merging a map of the sampled particle of the robot with a map of the sampled particle of the neighboring robot roto-translated based on a relative pose between the robot and the neighboring robot. As used herein, roto-translation includes one or combination of rotation and translation operations.

For example, in some implementations, the system 100 can optionally include a relative pose estimation component 137 that can use sensor information to determine the relative pose between two robots. The sensor information can have various forms and provide reliable estimation of the relative pose. For example, in one scenario, a facial of a neighboring robot is marked with visible markings, while the robot is equipped with a visual camera to detect the presence of the visible markings, e.g., checkerboard and, measure the relative pose between robots (i.e., relative range, bearing and heading). Additionally, or alternatively, the system 100 can receive relative pose estimation from a neighboring robot.

Some embodiments are based on realization that a particle filter solves a Bayesian inference problem, thus the multi-robot SLAM fusion should also follow the principles of Bayesian inference to guarantee the performance of the particle filter. However, the comparison of particles of different robots is pairwise, i.e., particles are grouped in pairs and two particles of each pair are compared with each other to update map and pose of a robot. However, when pairing the particles is deterministic, such a pairing can undermine performance guaranties provided by Bayesian inference.

Some embodiments are based on realization that random pairing of particles of different robots during probabilistic multi-robot positioning can reduce computational complexity to $O(K)$, where K is the number of randomly selected pairs of particles while ensuring the performance guarantees of particle filter. Indeed, random pairing is probabilistic and follows the principles of Bayesian inference to guarantee performance of the particle filter. In addition, random pairing is also simple, computationally efficient, and suitable for parallel computing.

To that end, a particle tuner is configured to pair a probabilistically sampled particle of the robot with a probabilistically sampled particle of the neighboring robot to perform particles update.

A network interface controller 150 is adapted to connect the system 100 through the bus 106 to a network 190. Through the network 190, using transceiver 126, the system can transmit the particles of the robot to the neighboring robot and/or request the neighboring robot to transmit its particles. In addition, the system 100 includes a sensor interface 180 to request the measurements from the sensors of the robot and/or to detect rendezvous with the neighboring robot when the robot is in proximity to the neighboring robot to request the neighboring robot to transmit its particles.

In some implementations, a human machine interface 110 within the system 100 connects the system to a keyboard 111 and pointing device 112, wherein the pointing device 112 can include a mouse, trackball, touchpad, joy stick, pointing stick, stylus, or touchscreen, among others. The system 100 includes an output interface configured to output the current pose of the robot. For example, the output interface can include a memory to render the pose of the robot and/or various interfaces to system benefiting from the estimated pose of the robot. For example, the system 100 can be linked through the bus 106 to a display interface 160 adapted to connect the system 100 to a display device 165, wherein the display device 165 can include a computer monitor, camera, television, projector, or mobile device, among others. The system 100 can also be connected to an application interface 170 adapted to connect the system to the equipment 128 for performing a robot specific tasks based on position of the robot.

Particle Filter (PF)-Based SLAM

Some embodiments use a particle filter (PF)-based SLAM to produce particles used in cooperative multi-robot SLAM.

Figure 2A:
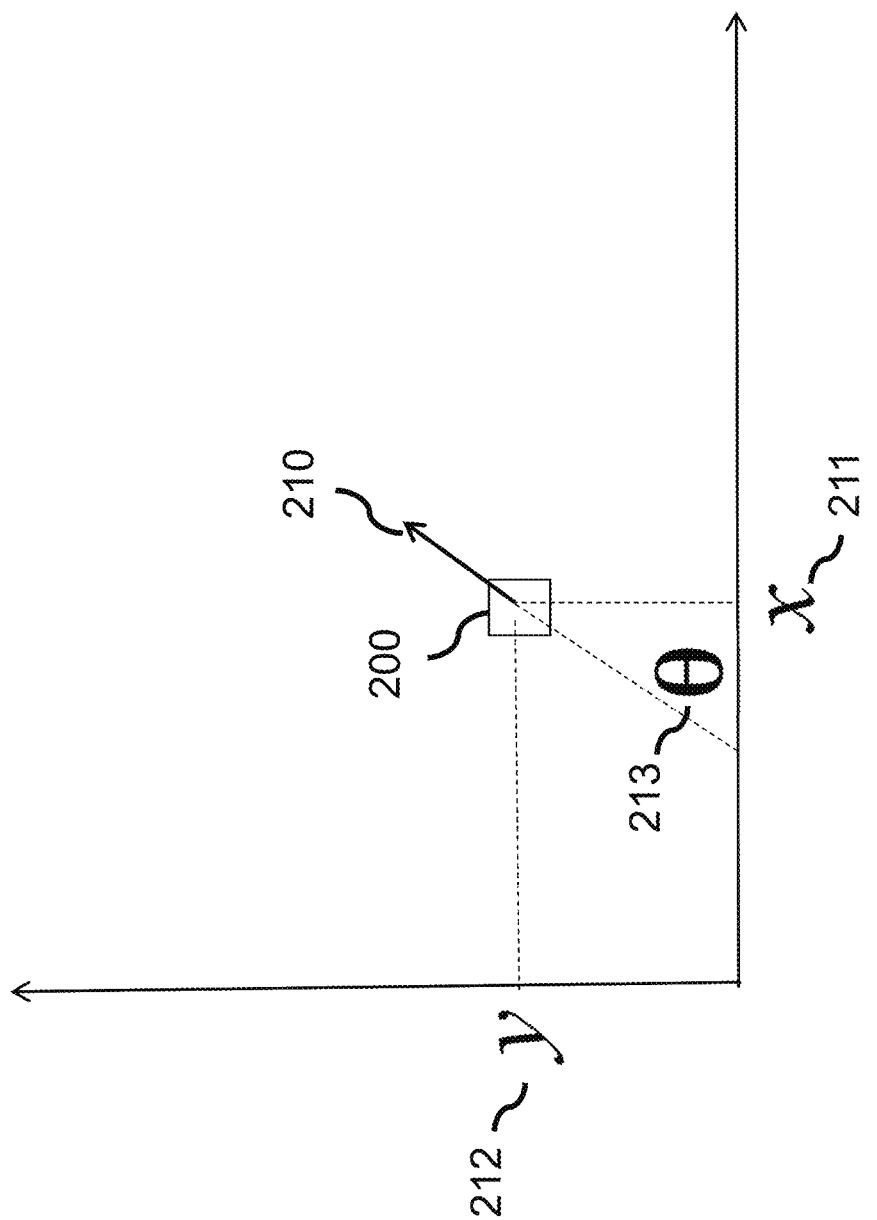
FIG. 2A is an illustration of robot's pose in a reference system used by some embodiments.

FIG. 2A is an illustration of robot's pose in a reference system used by some embodiments. A pose 210 of a robot 200 in a 2D environment includes robot's 2D coordinates (x,y) 211 212 and orientation, also called heading, θ 213 with respect to the coordinate system associated with the environment. The 2D coordinates and orientation at time t are collected into a pose vector $x_t=[x_t\ y_t\ \theta_t]^T$, where the operator T denotes the vector/matrix transpose.

In some embodiments, the pose of the robot is determined in a coordinate system attached to a robot. For example, in some implementations, the map in a particle of the robot is determined in a first coordinate system aligned with the pose of the robot in the particle, such that the movement of the robot causes the movement of the first coordinate system. Similarly, the map in a particle of the neighboring robot is determined in a second coordinate system aligned with the pose of the neighboring robot in the particle, such that the movement of the neighboring robot causes the movement of the second coordinate system. The system 100 roto-translates one or combination of the map in the particle of the robot and the map in the particle of the neighboring robot to align the first and the second coordinate systems.

Some embodiments use various environment models. For example, some embodiments use two environment models in mapping. In a feature-based mapping, the environment is represented with features and its map contains coordinates of features' locations. In an occupancy-grid mapping, the environment is divided into N grid cells such that the ith grid cell $m_i$ in the map is labeled with $m_i=1$ if it is occupied, $m_i=0$ if it is free, or "unknown" in the case the measurements do not provide sufficient evidence to detect its occupancy. While the disclosed methods are also valid for the feature-based mapping, we present them by focusing on occupancy-grid mapping.

Figure 2B:
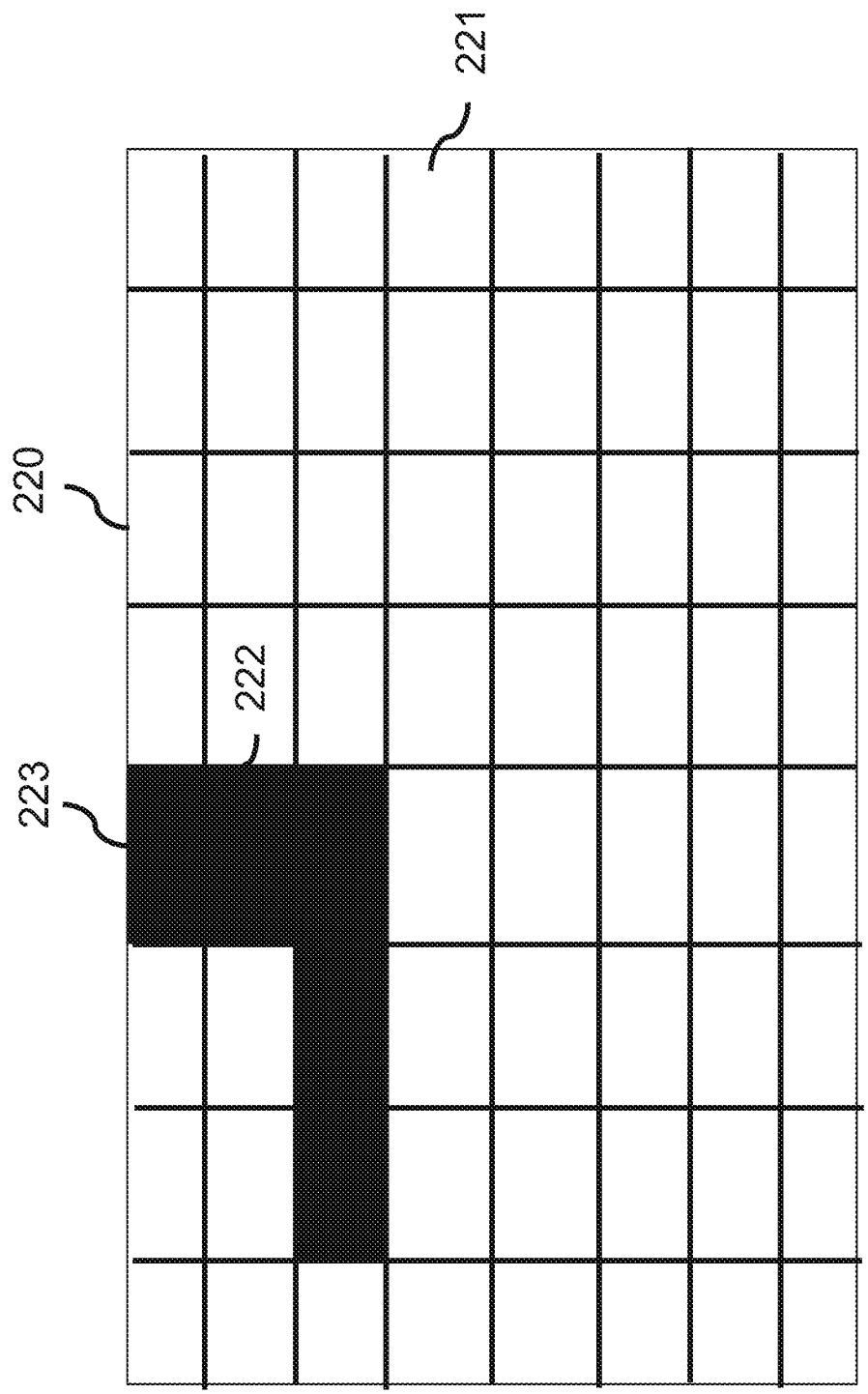
FIGS. 2B and 2C show examples of an occupancy grid map used by some embodiments.
Figure 2C:
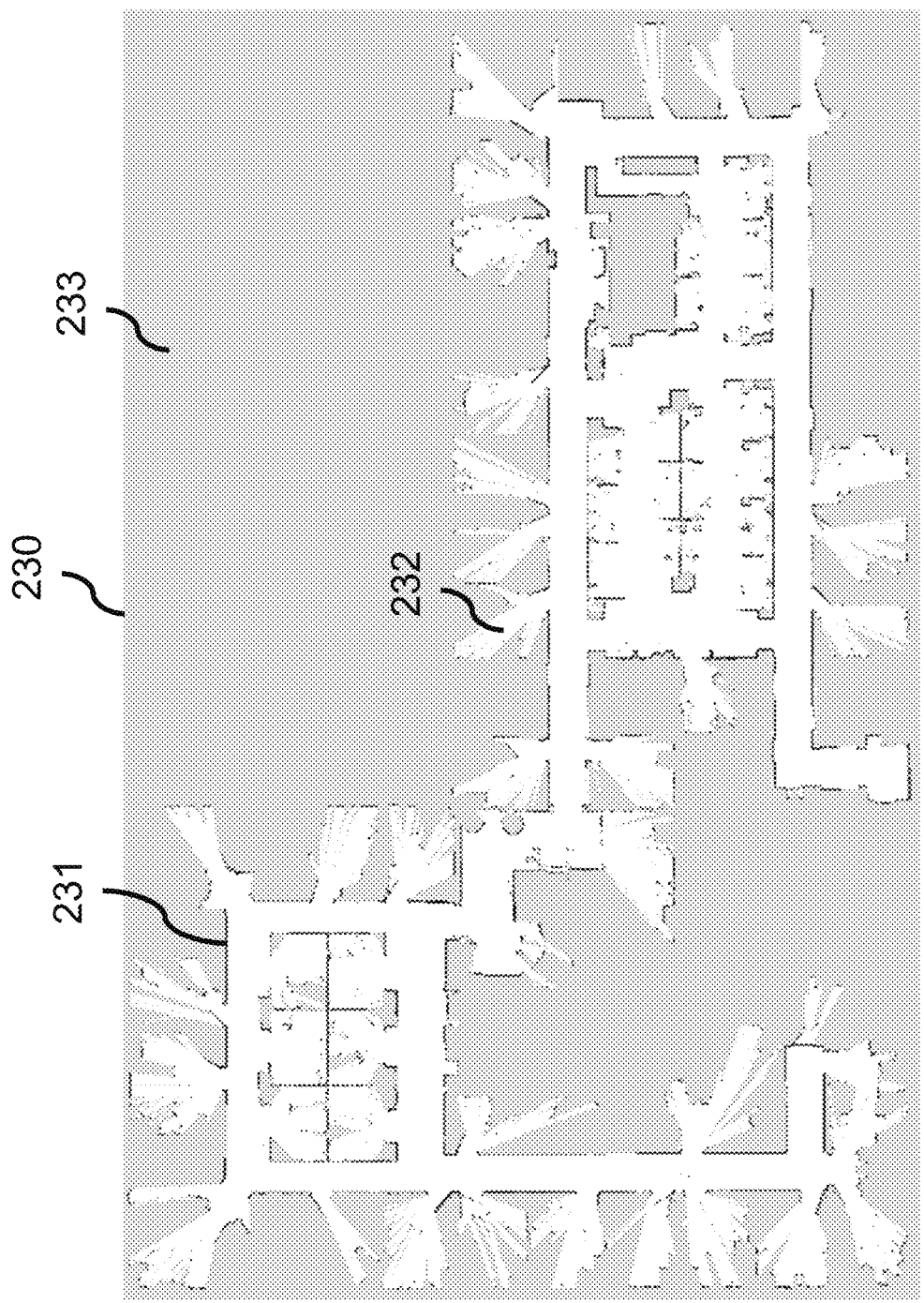

FIGS. 2B and 2C show examples of an occupancy grid map used by some embodiments. An unknown area 220 of the environment is divided into 8 by 8 bins where a bin is either occupied 222 or unoccupied 221. For example, multiple consecutive bins that are occupied indicate presence of a wall 223. The occupancy grid map 230, shown in FIG. 2C, is obtained from a real-world experiment with 2.5-by-2.5 cm grid cells and where, as shown, grid cells colored in black are occupied 231, grid cells colored in white 232 indicate free regions and those colored in grey 233 are "unknown".

Succinctly, the occupancy grid map is represented with a vector $m \in \{0,1\}^N$ collecting occupancy state of each grid cell $m_i$, i=1,2, . . . , N into a vector. The grid cells are commonly assumed to be independent given measurements $\mathcal{D}$, i.e., $$p(m|\mathcal{D}) = \pi_{i=1}^N p(m_i|\mathcal{D}) \qquad (1)$$

In general, the grid cells are dependent in a sense that if a grid cell is occupied, chances are that the neighboring grid cells are also occupied since they all together represent a region in the map such as a wall or some obstacle. However, viewing grid cells as a collection of dependent random variables and estimating their occupancy state jointly would lead to an exponential computational complexity. Consequently, we stick to independence assumption (1).

At least two types of measurements are collected as a robot travels through the environment. Namely, its laser scan at time t delivers ranging measurements representing distances from the robot to the obstacles seen within its field of view. These measurements are collected into vector $z_t$. The ranging measurements $z_t$ are probabilistically modeled with $p(z_t|x_t, m)$, representing probability of obtaining a realization of $z_t$ for a given pose $x_t$ and map m. Intuitively, the aim is to give a large probability mass to the measurements consistent with a given robot pose and map.

The measurements associated with robot motion are collected into vector $u_t$, representing the odometric sensor measurements within the time interval (t−1, t]. The odometric sensors can be wheel encoders, in which case we talk about true measurements, or control inputs issued to the robot which are treated as measurements for the sake of pose estimation. The robot motion model is probabilistically described with $p(x_t|x_{t-1}, u_t)$, representing a probability of finding a robot at some pose realization $x_t$, given its pose $x_{t-1}$ at time t−1, and odometry measurement $u_t$. Intuitively, the pose realizations of $x_t$ not consistent with the pose at time t−1 and odometry measurements receive a relatively small probability mass.

Single-Robot SLAM

Figure 3A:
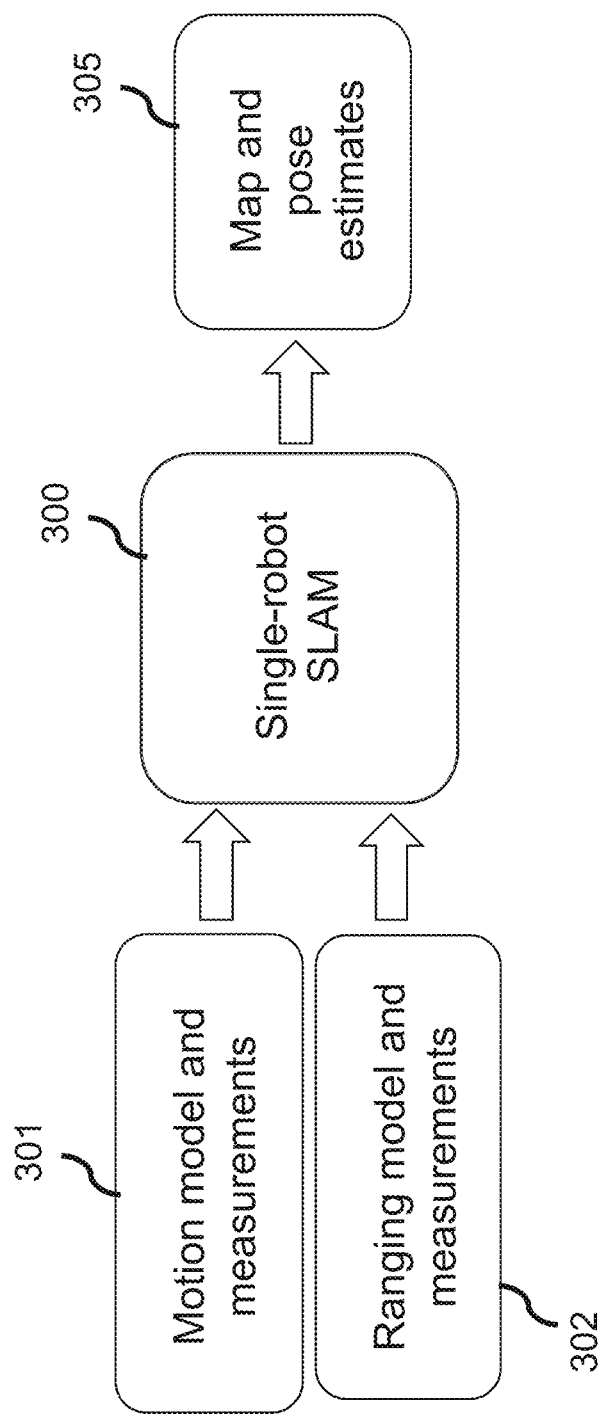
FIG. 3A shows a principle block diagram of a method for single-robot SLAM estimation according to some embodiments.

FIG. 3A shows a principle block diagram of a method for single-robot SLAM estimation according to some embodiments. The method 300 takes as inputs motion model and measurements 301, as well as ranging model and measurements 302, and produces an estimate of the map and robot's pose in the map 305.

The aim of robot SLAM within the Bayesian inference framework is to infer the probability distribution of a map m and robot's pose $x_t$ in the map at time t, given all ranging and odometry measurements up to time t. That is, the objective is to find $$p(m,x_t|\mathcal{D}_t) \triangleq p(m,x_t|u_{0:t},z_{0:t}) = p(m,x_t|u_0, \ldots, u_t,z_0, \ldots, z_t) \qquad (2)$$

where $u_{0:t}$ and $z_{0:t}$ are, respectively, motion and ranging measurements from the initial until current time instant t, and $\mathcal{D}_t$ is the collection of all motion and ranging measurements up to time t. In addition, the inference of (2) needs be done sequentially, that is, the belief about map and robot's pose at time t should be updated from the belief of the map and robot's pose at time t−1. This is conceptually done by employing the Bayes' filter, supplied with the motion model $p(x_t|x_{t-1}, u_t)$ and ranging model $p(z_t|x_t, m)$. The Bayes' filter boils down to the Kalman filter in case of linear and Gaussian motion and ranging models.

Otherwise, upon the linearization of those models, the Bayes' filter becomes the extended Kalman filter. More generally, to avoid model linearization, the Bayes' filter is implemented by means of a PF, which is at the core of the state of the art single-robot SLAM algorithm, called Fast-SLAM.

In short, the PF represents the probability distribution (2) with a certain number of possible map and pose realizations, called particles. That is, the SLAM algorithm produces a set of particles at a time instant t.

Figure 3B:
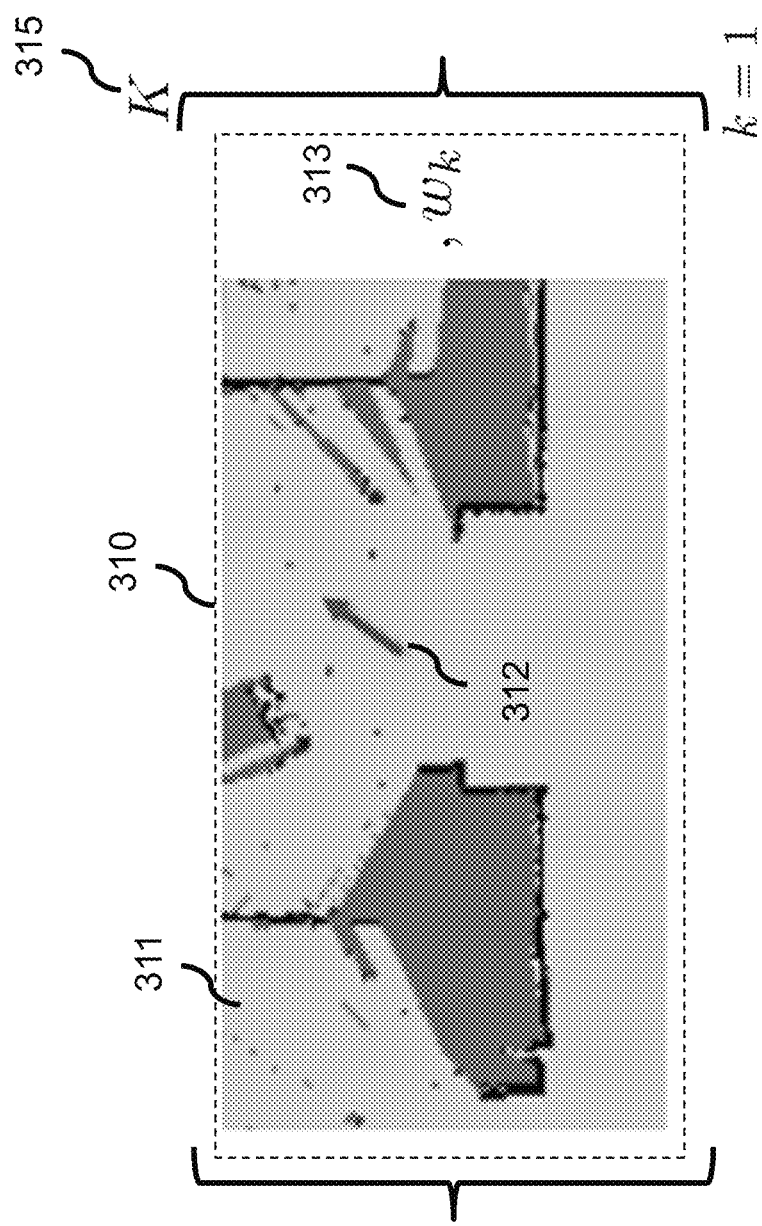
FIG. 3B shows an illustration of a particle in a particle filter-based single-robot SLAM used by some embodiments.

FIG. 3B shows an illustration of a particle in a particle filter-based single-robot SLAM used by some embodiments. Each particle 310 is a triplet including one map hypothesis 311, robot's pose in the map 312 and the weight $w_k$ 313 representing the importance of such map and pose combination. The number of particles is K 315. A combination of map and pose in each particle can be seen as one hypothesis of environment's map and robot's pose in that map consistent with the motion and ranging measurements.

With a slight abuse of notation, the PF can be thought of as approximating the belief of the map and robot's pose in the map at time t as $$p(m,x_t|u_{0:t},z_{0:t}) \approx \Sigma_{k=1}^{K} w_{t,k} \delta(m-m_{t,k}) \delta(x-x_{t,k}), \quad (3)$$

where $\delta()$ is the Dirac's delta function, while $w_{t,k}$, $m_{t,k}$ and $x_{t,k}$ are, respectively, the weight, map and pose of the kth particle corresponding to time instant t.

An example of the PF-based robot SLAM is a grid-based FastSLAM having the following basic steps. Assuming robot's understanding of the world at time t−1 is represented with a set of K particles $\{w_{t-1,k}, m_{t-1,k}, x_{t-1,k}\}_{k=1}^{K}$, it is updated based on robot's motion measurements between t−1 and t and ranging measurements taken at t as follows 1. Sample pose at time t from the motion model, given the motion measurement $u_t$ and robot's pose at time t−1 represented with $x_{t-1,k}$, i.e., $x_{t,k} \sim p(x|x_{t-1,k}, u_t)$.
2. Update occupancy probabilities of map's grid cells based on ranging measurements $z_t$ so as to yield $p(m_{t,k}|x_{t,k}, m_{t-1,k}, z_t)$. Note that only the grid cells measured by $z_t$ are updated.
3. Compute the weight of a particle according to how much the ranging measurements at t aligns with the map at time t−1 and robot's pose in that map at time t, $$w_{t,k} \propto w_{t-1,k} \times p(z_t|x_{t,k}, m_{t-1,k}) \quad (4)$$

4. Once all K particles are processed as per previous steps, normalize them so that their sum is 1.
5. The resulting particle set at time t is $\{w_{t,k}, m_{t,k}, x_{t,k}\}_{k=1}^{K}$.

Robot Encounters

As already described, robots occasionally meet and exchange some information to aid cooperative SLAM. Some embodiments implement the encounters using at least two principles. First, regardless of whether an encounter occurs randomly or is arranged by proper control of the robots, at the encounter of two robots, at least one robot is enabled to detect the presence of the other robot. In a two robot scenario, one way to achieve this is to equip one robot with a visual tag and the other one with the RGB camera. Then, a computer vision algorithm looks for a tag in the RGB camera feed and, in case of an encounter, detects the presence of the other robot. Other approaches in attaining this requirement are possible.

Figure 4A:
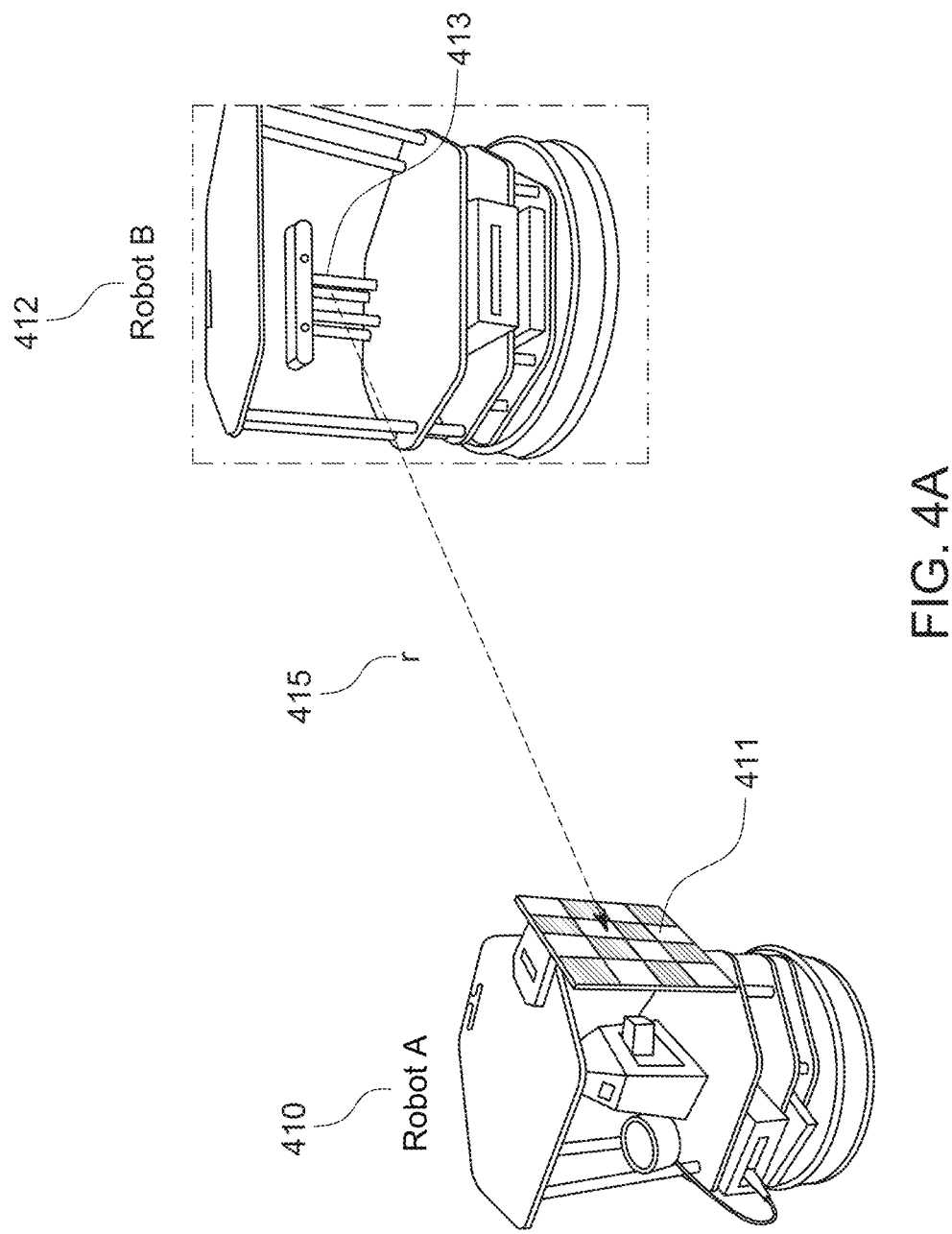
FIGS. 4A and 4B show examples of relative pose between robots used by some embodiments.
Figure 4B:
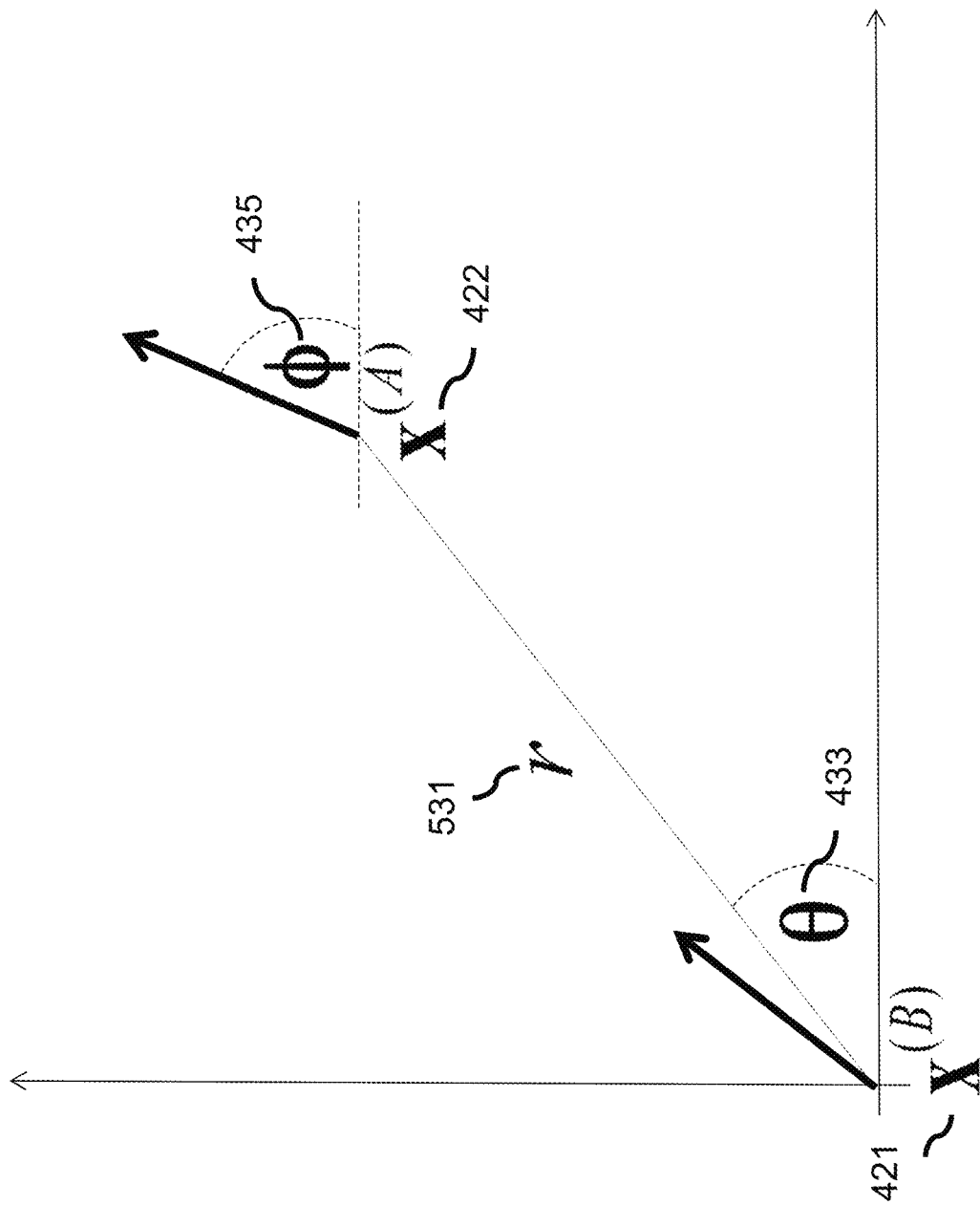

FIGS. 4A and 4B show examples of relative pose between robots used by some embodiments. In this example, robot A 410 is equipped with a checkerboard 411 which serves as its visual tag. Then, when robot A and robot B 412 are in close proximity and in orientation such that the camera 413 of robot B points toward the checkerboard of robot A, robot B detects the presence of robot A and measures their relative pose r 415.

After the robots detect that they are in the vicinity of each other, one (or both) measure their relative pose. The relative pose comprises of relative range r, bearing θ and orientation ϕ and is given in the coordinate frame of reference of the robot performing the relative pose measurement.

Referring to FIG. 4B, robot B whose pose is $x^B$ 421 measures relative pose to robot A whose pose is $x^A$ 422. The relative pose measurement r comprises of their relative distance r 531, relative bearing θ 433 of robot A with respect to robot B and robot A's orientation, also called heading, ϕ 435. Note that bearing θ and orientation ϕ are both expressed in the frame of reference of robot B. In one implementation, the bearing and orientation are obtained from the RGB camera frames containing the identity tag of the other robot, while the distance r yields from the bearing measurement and ranging scan.

To perform a proper information fusion within the Bayesian framework, some embodiments specify a probabilistic model for the relative pose measurement, conditioned on the robots' poses and map. Formally, this model is captured with $p(r, \theta, \phi|x_t^A, x_t^B, m)$, where m is map of the environment and $x_t^A$ and $x_t^B$ denote poses of two robots at the encounter time t in the map m. The disclosed methods, described in the next section, are not restricted by the choice of $p(r, \theta, \phi|x_t^A, x_t^B, m)$.

In one of the embodiments, the measurements of the relative range r, bearing θ and heading ϕ are independent and Gaussian distributed with error of zero mean and variance $\sigma_r^2$, $\sigma_\theta^2$ and $\sigma_\phi^2$, respectively. Therefore, $$p(r, \theta, \phi|x_t^A, x_t^B, m) = p(r|x_t^A, x_t^B) p(\theta|x_t^A, x_t^B) p(\phi|x_t^A, x_t^B) = \quad (5)$$

$$\mathcal{N}(r; \bar{r}_t, \sigma_r^2) \mathcal{N}(\theta; \bar{\theta}_t, \sigma_\theta^2) \mathcal{N}(\phi; \bar{\phi}_t, \sigma_\phi^2),$$

where $\mathcal{N}(x; \mu, \sigma^2) = 1/\sqrt{2\pi\sigma^2} \exp(-(x-\mu)^2/2\sigma^2)$ is Gaussian distributed variable x, of mean μ and variance $\sigma^2$, while $\bar{r}_t$, $\bar{\theta}_t$ and $\bar{\phi}_t$ are relative range, bearing and orientation corresponding to and directly computed from the robots' poses $x_t^A$ and $x_t^B$ at time t. In general, the variances $\sigma_r^2$, $\sigma_\theta^2$ and $\sigma_\phi^2$ can be calibrated from the measured data, or assessed based on the accuracy of the measurement method and resolution of the map m.

In other embodiment, each robot is capable of detecting the presence of the other robot and measuring relative range and bearing. We denote with $r_{AB}$ ($r_{BA}$) the relative range measurement made by robot A (robot B). Analogously, let $\theta_{AB}$ ($\theta_{BA}$) denote the relative bearing measurement made by robot A (robot B). If robots exchange their measurements $\theta_{AB}$ and $\theta_{BA}$, then each can estimate the heading of the other from simple geometry such that the orientation of robot B in the frame of reference of robot A is given by $$\phi_{AB} = \pi + \theta_{AB} - \theta_{BA} \quad (6)$$

In this case, a robot does not need to measure orientation of the other robot. However, in such a case the relative bearing $\theta_{AB}$ and orientation $\phi_{AB}$ are not independent. Therefore, the covariance matrix of the relative pose measurement $r_{AB}$ made by robot A, defined as $$r_{AB} = [r_{AB} \theta_{AB} \pi + \theta_{AB} - \theta_{BA}] \quad (7)$$

is in the case of independent relative range and bearing measurements, given by $$\sum_{AB} = \begin{bmatrix} \sigma_{r_{AB}}^2 & 0 & 0 \\ 0 & \sigma_{\theta_{AB}}^2 & \sigma_{\theta_{AB}}^2 \\ 0 & \sigma_{\theta_{AB}}^2 & \sigma_{\theta_{AB}}^2 + \sigma_{\theta_{BA}}^2 \end{bmatrix} \quad (8)$$

where $\sigma_{r_{AB}}^2$, $\sigma_{\theta_{AB}}^2$ and $\sigma_{\theta_{BA}}^2$ are calibrated from the measured data, or assessed based on the accuracy of the measurement method and resolution of the map m.

Still assuming Gaussian distribution for analytical tractability, $$p(r_{AB}|x_t^A, x_t^B, m) = \mathcal{N}(r_{AB}; R_{AB}, \Sigma_{AB}) \quad (9)$$

where $R_{AB}$ is consistent and computed from the robots' poses $x_t^A$ and $x_t^B$.

As a remark, the relative pose model (7) assumes that robot A receives $\theta_{BA}$ from robot B. Given that robot B may also provide $r_{BA}$ robot A, robot A can estimate relative range r from $r_{AB}$ and $r_{BA}$ by averaging according to $\sigma_{r_{AB}}^2$ and $\sigma_{r_{BA}}^2$ and use that value in (7). We note that in such a case, the entry in the covariance matrix $\Sigma_{AB}$ corresponding to variance in r will depend on both $\sigma_{r_{AB}}^2$ and $\sigma_{r_{BA}}^2$ and should be adjusted accordingly.

Information Fusion Algorithm

In some implementations of cooperative SLAM, the robots move through an environment and independently perform single-robot SLAM based on motion and ranging measurements. To that end, the robots include a set of sensors for measuring movements of the robot in an environment and sensing occupied locations in the environment to produce sensor measurements and a processor configured to execute a SLAM module that processes the sensor measurements by a particle filter to produce a set of particles. However, the robots also include receivers configured to receive a set of particles of a neighboring robot to update the particles.

Figure 5A:
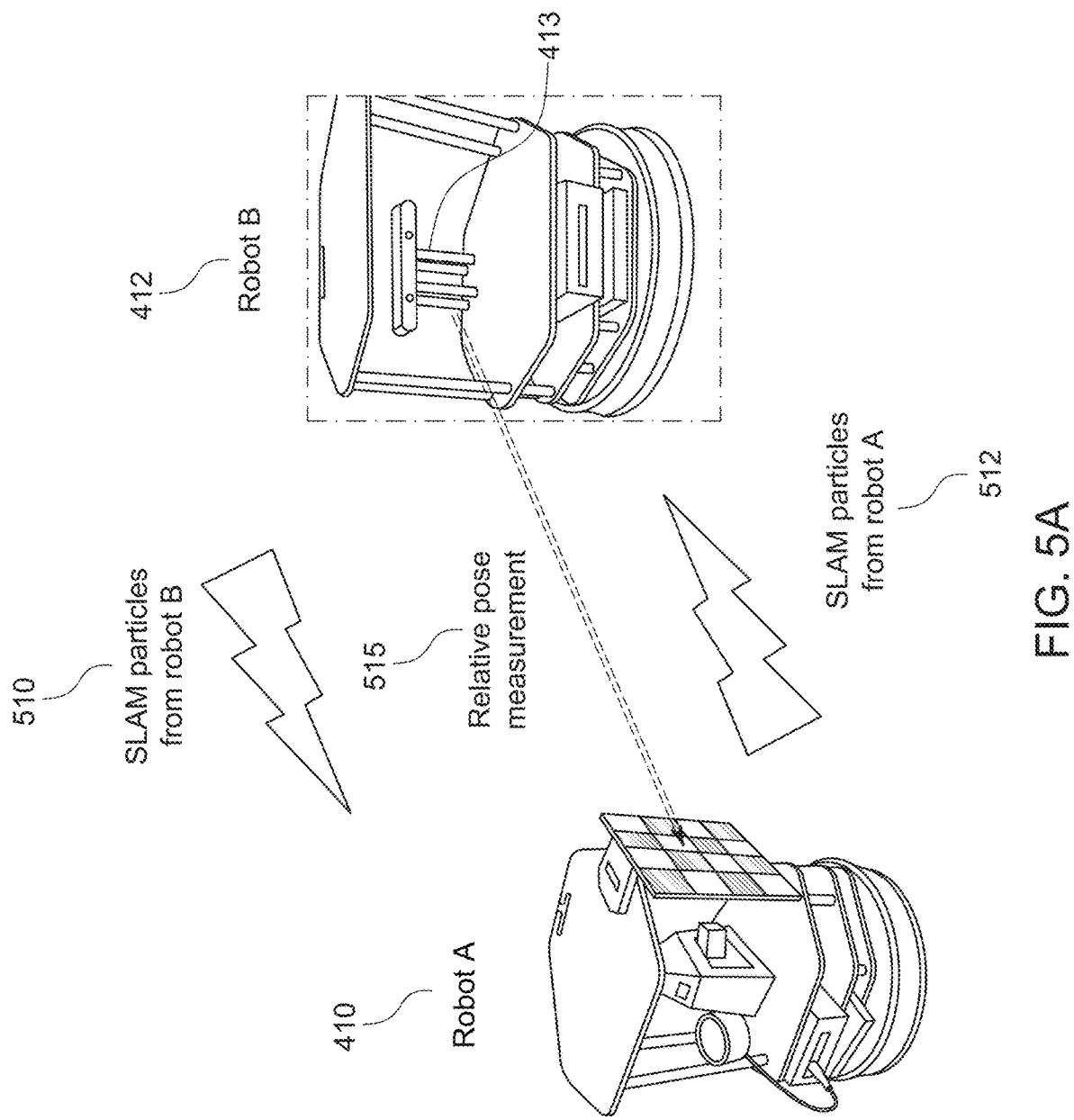
FIG. 5A shows an illustration of an exemplar encounter of two robots according to some embodiments.

FIG. 5A shows an illustration of an exemplar encounter of two robots according to some embodiments. Referring to FIG. 5A, when Robot B 412 detects presence of Robot A 410, or in more general setting one or both of them detect presence of each other, they measure relative pose 515 and exchange their SLAM particle sets. That is, Robot B transmits the set of its own particles 510 to Robot A. Additionally or alternatively, Robot A transmits the set of its particles 512 to Robot B. In addition to particle sets, Robot B sends its relative pose measurement to Robot A. More generally, if Robot A takes any of the measurements related to the relative pose between robots, it sends them to Robot B. The particle sets and relative pose measurement(s) are transmitted over a wireless link established between the robots when they detect each other and any wireless technology can be utilized for that task.

Figure 5B:
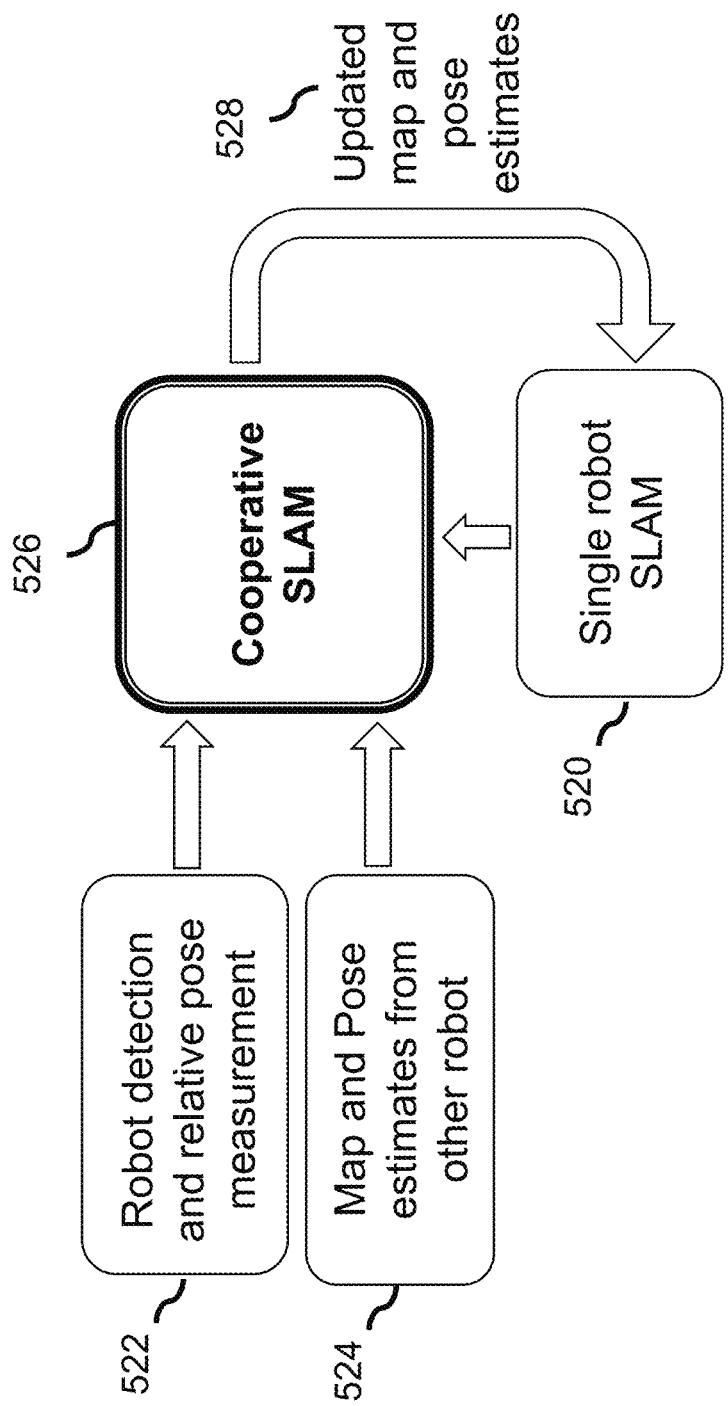
FIG. 5B shows a principle block diagram of the processing pipeline for cooperative SLAM according to some embodiments.

FIG. 5B shows a principle block diagram of the processing pipeline for cooperative SLAM according to some embodiments. Before an encounter, a robot performs single-robot SLAM 520 on its own until it detects the presence of some other robot, or some other robot detects its presence 522, followed by taking measurement(s) of the relative pose between robots 522. Upon receiving the single-robot SLAM particles from the other robot 524, the robot performs cooperative SLAM 526. This results in updated set of map and pose of particles 528, which are fed back to the single-robot SLAM routine 520. After the encounter, each robot continues moving through the environment on its own and performing the single-robot SLAM 520.

For example, two robots A and B meet at time t and exchange their SLAM particles. In addition, the robot which measures relative pose between robots sends the measurement to the other robot. This disclosure presents the development of SLAM fusion with respect to robot A and note that the equivalent development applies to robot B.

Figure 5C:
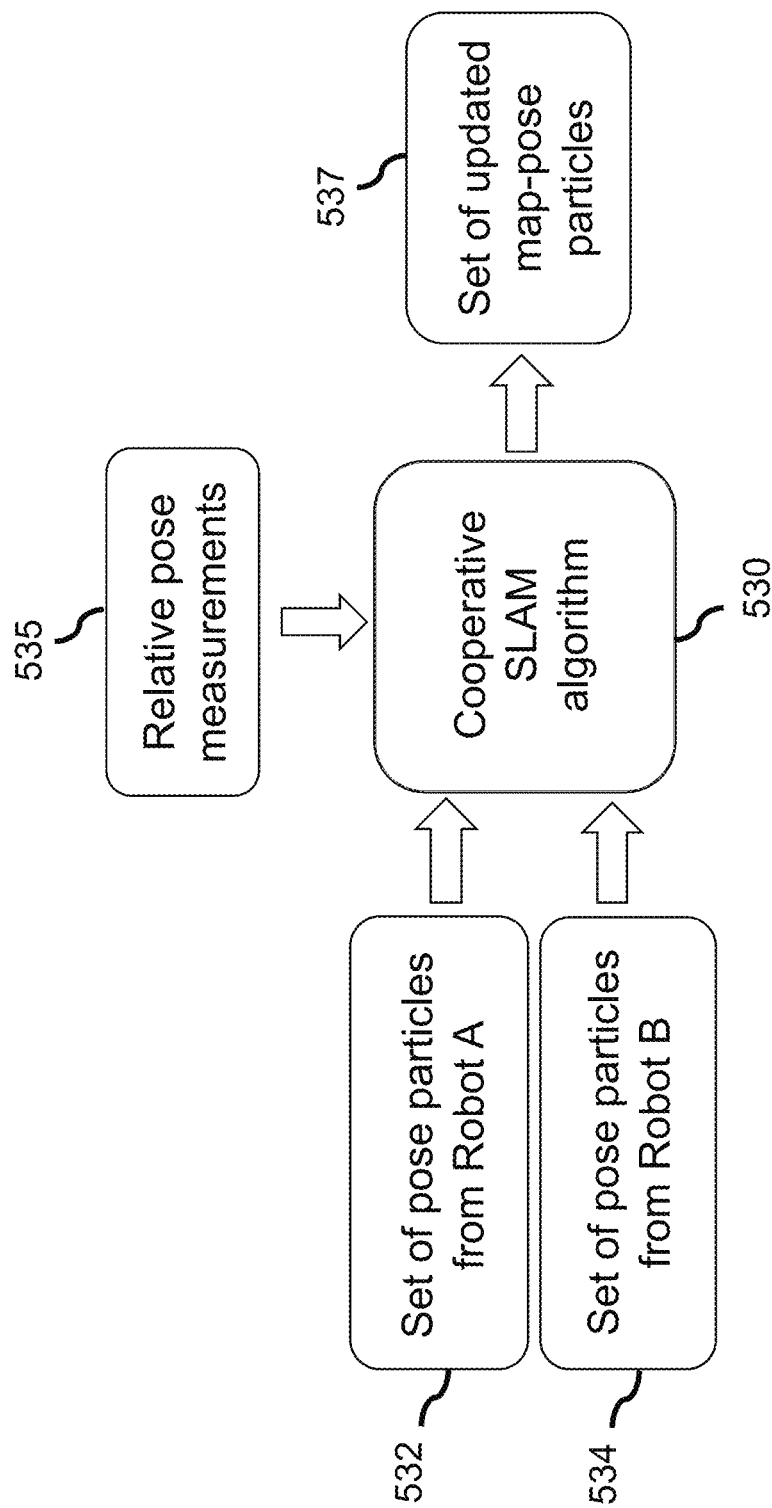
FIG. 5C shows a principle block diagram of the cooperative multi-robot SLAM according to some embodiments.

FIG. 5C shows a principle block diagram of the cooperative multi-robot SLAM according to some embodiments. The set of SLAM particles of robot A 532, the set of SLAM particles of robot B and received from robot B 534 are fused together with relative pose measurement(s) 535 according to our algorithm implemented in 530. The output of this block 537 is the resulting set of updated particles each representing one hypothesis of the map, pose of robot A in that map, together with its importance weight.

Cooperative SLAM Fusion Derivation

Assume, without loss of generality, that two robots, labeled A and B, move in an unknown environment and each performs a single-robot grid-based SLAM using particle filtering (PF). They encounter each other at time instant t. The measurements their sensors have collected up until time t are denoted $\mathcal{D}_t^A$ and $\mathcal{D}_t^B$, where $$\mathcal{D}_t^{A/B} = (u_{0:t}^{A/B}, z_{0:t}^{A/B}) \tag{10}$$

is a collection of all motion-related and ranging measurements taken by sensors on robot A/B. The single-robot SLAM yields a set of particles where each particle comprises of one hypothesis of the map of the environment, corresponding robot's pose in that map and the weight representing the importance of such a map-pose combination. That is, the posterior distribution of map $m_t^A$ and pose $x_t^A$ in that map, inferred by the robot A up until time t is represented as $$\mathcal{P}_t^A \triangleq \{w_{t,k}^A, x_{t,k}^A, m_{t,k}^A\}_{k=1}^K \sim p(m_t^A, x_t^A | \mathcal{D}_t^A). \tag{11}$$

Analogously, the inferred posterior distribution of robot B's understanding of the world and its pose in it, is also represented with a particle set such that $$\mathcal{P}_t^B \triangleq \{w_{t,k}^B, x_{t,k}^B, m_{t,k}^B\}_{k=1}^K \sim p(m_t^B, x_t^B | \mathcal{D}_t^B). \tag{12}$$

As indicated in (11) and (12), we assume, without loss of generality, that the two robots have the same number of particles K.

At an encounter, robots A and B exchange their particle sets and the relative pose measurement(s). Although the robots exchange their particle sets at the encounter, we start the derivation of the algorithm by considering the posterior distribution of the map and robots' poses in the map, given all the measurements they have made prior to the encounter, $$p' \triangleq p(m_{t^+}, x_{t^+}^A, x_{t^+}^B | \mathcal{D}_t^A, \mathcal{D}_t^B, r)$$

where r is the relative pose measurement and $t^+$ denotes a time instant immediately after the encounter and before robots move or take any ranging measurement. Alternatively, if the number of particles K is large enough to represent the posterior distributions (11) and (12) well, exchanging particles is approximately the same as exchanging all raw sensor measurements. This is because sensor measurements are summarized in particles and, formally, if $K \to \infty$, the particle set is a sufficient statistics of the sensor measurements such that the particles represent sensor measurements without information loss.

Some embodiments are based on realization of the need to consider a posterior distribution of the map and robots' poses in the map upon the encounter, as well as evolutions of maps and robots' trajectories in corresponding maps prior to the encounter, given all the measurements, $$p \triangleq p(m_{t^+}, x_{t^+}^A, x_{t^+}^B, m_{0:t}^A, x_{0:t}^A, m_{0:t}^B, x_{0:t}^B | \mathcal{D}_t^A, \mathcal{D}_t^B, r) \tag{14}$$

where $m_{0:t}^{A/B}$ is the map evolution and $x_{0:t}^{A/B}$ is the trajectory (time sequence of poses) of robot AB from the start until the encounter time instant t.

Applying Bayes' rule multiple times and leveraging the assumptions commonly used in probabilistic robotics, the posterior distribution (14) can be shown to satisfy $$p \propto p(r | x_{t^+}^A, x_{t^+}^B, m_{t^+}) \times \delta(x_{t^+}^A - x_t^A) \delta(x_{t^+}^B - x_t^B) \times \tag{15}$$
$$p(m_{t^+} | m_t^A, m_t^B, x_t^A, x_t^B, r) \times p(m_{0:t}^A, x_{0:t}^A | \mathcal{D}_t^A) p(m_{0:t}^B, x_{0:t}^B | \mathcal{D}_t^B)$$

where $\delta(a-b)$, is one if a=b, and is zero otherwise. Hence, the terms $\delta(x_{t^+}^{A/B} - x_t^{A/B})$ in (15) reflect our formal construction that $t^+$ is the time instant immediately after the encounter such that the robots have not had chance to move between t and $t^+$. We recognize in (15) that $p(r|x_{t^+}^A, x_{t^+}^B, m_{t^+})$ is the likelihood of measuring relative pose r in a map $m_{t^+}$ with robots' poses $x_{t^+}^{A/B}$.

The term $p(m_{0:t}^{A/B}, x_{0:t}^{A/B}|\mathcal{D}_t^{A/B})$ from (15) is the posterior distribution of the map evolution and trajectory of robot A/B in that map, given all its measurements collected until the encounter time instant t. We note that this posterior results from performing single-robot SLAM and keeping particles in each time instant. Consequently, (15) is represented with a sequence of particle sets $\mathcal{P}_0, \ldots, \mathcal{P}_t$ where each particle set $\mathcal{P}_\tau$ contains K triplets of map, pose and importance weight corresponding to robot's situational awareness based on its measurements up until time instant $\tau$.

Finally, the remaining term, $p(m_{t^+}|m_t^A, m_t^B, x_t^A, x_t^B, r)$ corresponds to a distribution of a map $m_{t^+}$ obtained upon the encounter given individual robots' maps and poses in those maps at the encounter, and the relative pose measurement r. We note that both robots share the same $m_{t^+}$ as it is evaluated from the same information. Intuitively, the merged map $m_{t^+}$ is unambiguously obtained from the relative pose between robots and individual robots' maps and poses.

Figure 6:
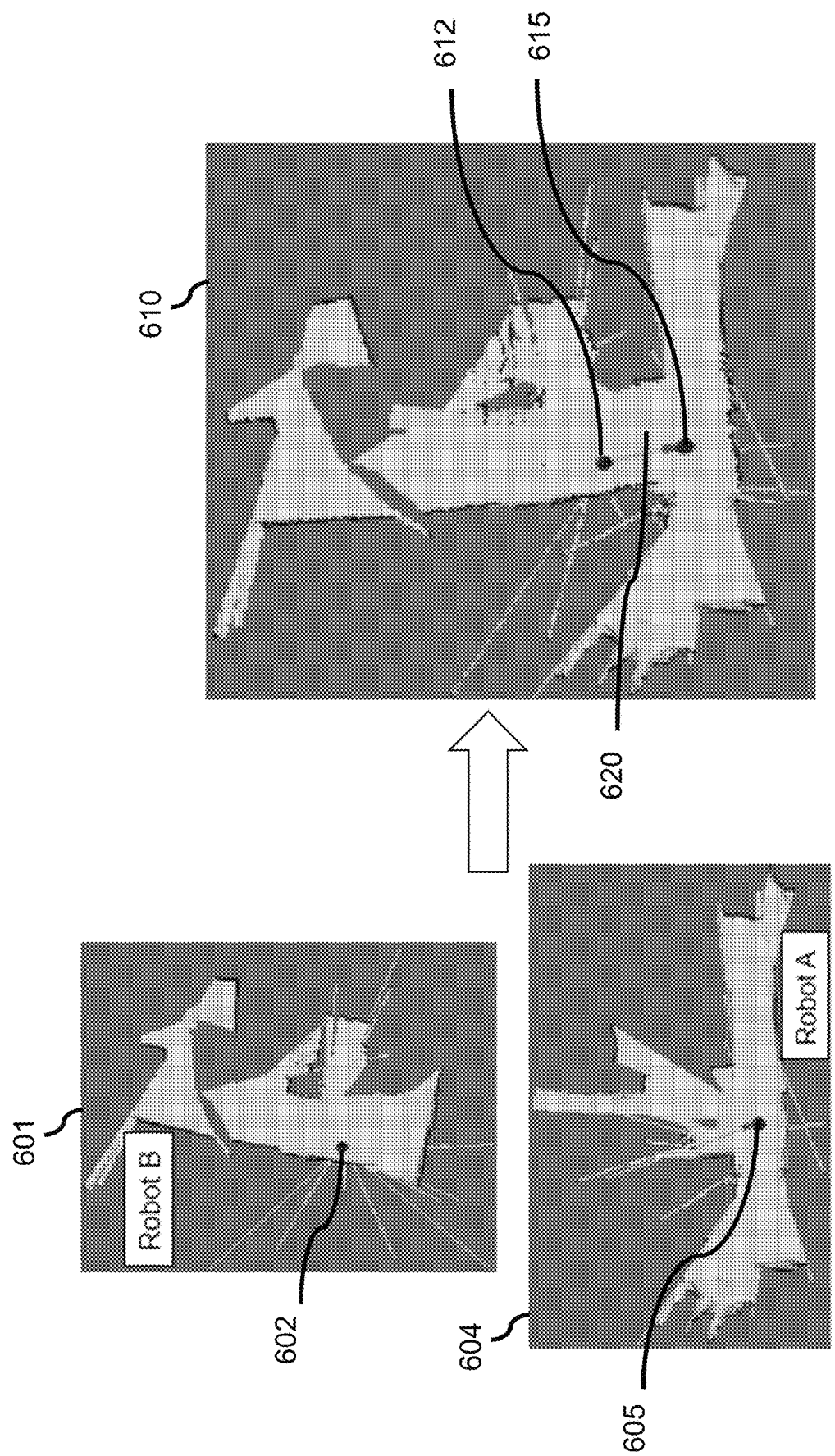
FIG. 6 shows an illustration of merging two maps originating from two robots according to some embodiments.

FIG. 6 shows an illustration of merging two maps originating from two robots according to some embodiments. As shown, one particle of robot A indicates its situational awareness comprising of the map 604 and its pose 605 in that map. Similarly, one particle of robot B contains a map hypothesis 601 and its pose 602 in that map. At the encounter, robot A obtains relative pose between the two robots, and receives map 604 and pose 605 hypotheses from the robot B. Then, robot A aligns the map of robot B with its own map so that the robot poses are consistent with the relative pose measurement. In other words, robot A roto-translates the map of robot B and represents the pose of robot B into its own frame of reference, based on the relative pose measurement. Finally, robot A overlays its own and the map of robot B on top of each other, resulting in the merged map 610, where robots' poses 612 615 in the merged map are with a relative pose 620 consistent with the relative pose measurement.

The information fusion aims to draw samples representing the target distribution p from (15), where each sample comprises of one map evolution $m_{0:t}^{A/B}$ and trajectory $x_{0:t}^{A/B}$ of each robot prior to encounter, as well as their poses $x_{t^+}^{A/B}$ and the map $m_{t^+}^{A/B}$ upon the encounter. Leveraging the importance sampling methodology, some embodiments generate the samples from the proposal distribution q given by $$q = \delta(x_{t^+}^A - x_t^A)\delta(x_{t^+}^B - x_t^B) \times \quad (16)$$
$$p(m_{t^+}|m_t^A, m_t^B, x_t^A, x_t^B, r) \times p(m_{0:t}^A, x_{0:t}^A|\mathcal{D}_t^A)p(m_{0:t}^B, x_{0:t}^B|\mathcal{D}_t^B)$$

It is an objective of some embodiments to generate a set of particles representing p' from (13), where each particle contains one hypothesis of the merged map $m_{t^+}$ and poses $x_{t^+}^A$ and $x_{t^+}^B$. To achieve so, the embodiments sample from the proposal distribution q and discard map evolutions and trajectories prior to the encounter time t. Equivalently, the kth hypothesis of the merged map and poses, $\{m_{t^+,k}, x_{t^+,k}^A, x_{t^+,k}^A\}$ is sampled as 1. Generate $\{m_{t,k}^A, x_{t,k}^A\}$ from $p(m_t^A, x_t^A|\mathcal{D}_t^A)$ by sampling from $\mathcal{P}_t^A$ according to particle weights. Analogously, generate $\{m_{t,k}^B, x_{t,k}^B\}$ from $p(m_t^B, x_t^B|\mathcal{D}_t^B)$ by sampling from $\mathcal{P}_t^B$. We note that the two sets of particles result from performing single-robot SLAM on each robot prior to and are exchanged at their encounter.
2. Given a hypothesis of robots' maps and poses $m_{t,k}^A$, $m_{t,k}^B$, $x_{t,k}^A$, $x_{t,k}^B$, as well as the relative pose measurement r, compute a hypothesis of the merged map, $m_{t^+,k}$.
3. Since robots do not move between t and $t^+$, $x_{t^+}^A = x_t^A$ and $x_{t^+}^B = x_t^B$.
4. The weight associated with the kth particle is evaluated as the ratio between the target and proposal distribution $$\tilde{w}_{t,k} = \frac{p}{q} \propto p(r|x_{t^+}^A, x_{t^+}^B, m_{t^+}) \quad (17)$$

and normalized so as sum up to 1. Recall that individual robots' maps $m_{t,k}^A$ and $m_{t,k}^B$ are merged so that robots' poses $x_{t,k}^A$ and $x_{t,k}^B$ are aligned with the relative pose measurement r. In other words, the relative pose measurement r is equally consistent over different hypotheses of merged maps and robots' poses in them such that $$\tilde{w}_{t,k} = \frac{1}{K} \quad (18)$$

where K is the number of resulting particles, which we assume without loss of generality to be equal to the number of particles each robot uses in the SLAM prior to their encounter. Overall, the environmental awareness of each robot AB is upon the encounter at time $t^+$ represented with the set of particles $\mathcal{P}_{t^+}^{A/B} = \{m_{t^+,k}, \hat{x}_{t,k}^{A/B}, 1/K\}$.

Interpretation

As shown in (15), the posterior distribution p factorizes over map evolution and trajectory posterior of each robot, $$p = \ldots p(m_{0:t}^A, x_{0:t}^A|\mathcal{D}_t^A)p(m_{0:t}^B, x_{0:t}^B|\mathcal{D}_t^B) \quad (19)$$

In other words, if the set of particles $\mathcal{P}_t^{A/B}$ represents corresponding posterior $p(m_{0:t}^{A/B}, x_{0:t}^{A/B}|\mathcal{D}_t^{A/B})$ without information loss, then exchanging sensor measurements $\mathcal{D}_t^{A/B}$ is equivalent to exchanging SLAM particles $\mathcal{P}_t^{A/B}$ at an encounter.

In general, a large number of particles (mathematically, infinitely many) are required to represent a distribution without the information loss. However, a finite and often relatively small number of particles provides a reasonable representation of the underlying distribution. Hence, assuming that the particle sets $\mathcal{P}_t^{A/B}$ capture the underlying posteriors $p(m_{0:t}^{A/B}, x_{0:t}^{A/B}|\mathcal{D}_t^{A/B})$ with insignificant information loss, the factorization in (19) indicates that exchanging particle sets is approximately equivalent to exchanging sensor measurements.

There are multiple benefits from having robots exchange particles instead of sensor measurements. First, since the robots perform single-robot SLAM prior to and after the encounter, and wherein the sensor measurements at time t are discarded as soon as the particles get updated from $\mathcal{P}_{t-1}$ to $\mathcal{P}_t$, our approach with particle exchange naturally integrates within the single-robot SLAM pipeline. Second, not storing sensor measurements during mapping reduces the burden on memory requirements imposed on robots' storage infrastructure. Third, the communication bandwidth required to support data exchange between robots at an encounter is considerably reduced when they exchange particles compared to the case of when they exchange sensor measurements.

The proposed algorithm for fusing the exchanged particle sets seamlessly supports possibly heterogeneous robot platforms. Namely, to fuse the measurements collected up until time t so as to yield the particle set $\mathcal{P}_t^{A/B}$, the single-robot SLAM routine has to be supplied with motion and ranging model parameters, which depend on the sensors deployed on the corresponding robot. Consequently, in the case the robots exchange sensor measurements at an encounter, they also need to be supplied with each other's sensors' model parameters. In comparison, this is not needed when robots exchange particles as each particle set already contains information about sensors whose measurements it summarizes.

The computational complexity of the proposed fusion method is linear in the number of particles K, where the most computationally demanding segment is the map merging step. Notably, fusing particles has significantly lower computational complexity compared to the case where robots exchange sensor measurements at an encounter and each needs to transform the measurements from the other robot into its own frame of reference, based on the measured relative pose, and run t update steps of the single-robot SLAM algorithm over the transformed measurements.

Finally, we note that the proposed method is fully decentralized as each robot fuses its own particles with the particles of the other robot it encounters using its own computational resources. In other words, there is no need for a centralized processor to perform cooperative multi-robot SLAM.

Map Merging

As discussed with reference to FIG. 6 the map merging process where the maps from each randomly sampled particle from the corresponding sets of particles are merged. In addition, some embodiments update the overlapping region of the maps in a special manner consistent with the probabilistic nature of particle filters. A grid-based map includes a number of grid cells whose occupancy probability is continuously updated during the SLAM process. The question here is how to compute the occupancy probability of a grid cell in the merged map based on occupancy probabilities given by the maps from the sampled pair of particles. That is, if a certain grid cell is estimated to be occupied with probability 0.9 by robot A and with probability 0.4 by robot B, the question here is how to fuse those probabilities so as to compute the occupancy probability of that grid cell in the merged map.

To develop a method for merging occupancy probabilities of the same grid cell, this disclosure first provides details on how the occupancy probability is updated in a single-robot SLAM. Considering robot A, the single-robot SLAM represents its knowledge of the map through a log odd ratio of probabilities that a cell is occupied versus unoccupied, given the measured data and true robot's trajectory. The log odd ratio for cell i at time t is defined as $$l_{i,t}^A \triangleq \log \frac{p(m_i = 1 | x_{0:t}^A, \mathcal{D}_{0:t}^A)}{p(m_i = 0 | x_{0:t}^A, \mathcal{D}_{0:t}^A)} \tag{21}$$

The single-robot SLAM updates the log odd ratio of the grid cell i at time t based on the log odd ratio of that cell at time t−1 and ranging measurements as $$l_{i,t}^A = l_{i,t-1}^A + \log \frac{p(m_i = 1 | z_t^A, x_t^A)}{p(m_i = 0 | z_t^A, x_t^A)} - l_{i,0}^A \tag{22}$$

where $l_{i,0}^A$ is the log odd ratio of the ith grid cell at the SLAM beginning and depends on the prior belief about the grid cell occupancy. In case of the uniform occupancy prior distribution, $l_{i,0}^A = 0$. The middle term in (22) is an inverse ranging model, which depends on the type of employed ranging sensor. Note that the probabilities in (21) and (22) are conditioned on robot's trajectory. In principle, if the robot trajectory is known, which is rarely available, the above expressions represent mapping method with known robot's poses. However, the robot's poses are often not known and are estimated along the map in the SLAM algorithm and, thus, the robot's poses in the above expressions are poses of the SLAM particles. Consequently, (22) is used to update map $m_{t,k}$ at time t of some particle k, based on the ranging measurements at time t, map $m_{t-1,k}$ at time t−1 of that particle and pose hypothesis $x_{t,k}$ generated from $p(x | x_{t-1,k}, u_k)$.

To derive fusion method for grid cell's occupancy probabilities provided by two robots, some embodiments start from assumption that the two robots exchange all sensor measurements at an encounter and consider the ratio of occupancy probabilities of a grid cell i, given all sensor measurements from both robots, $$R_{i,t} = \frac{p(m_i = 1 | x_{0:t}^A, x_{0:t}^B, \mathcal{D}_t^A, \mathcal{D}_t^B)}{p(m_i = 0 | x_{0:t}^A, x_{0:t}^B, \mathcal{D}_t^A, \mathcal{D}_t^B)} \tag{23}$$

In other words, assuming that sensor measurements of both robots are available, as well as their trajectories, the embodiments aim to estimate occupancy probability of a grid cell i.

Using the Bayesian inference principles, the occupancy probability ratio $R_{i,t}$ is given by $$R_{i,t} = R_{i,t-1} \frac{p(z_t^A, z_t^B | m_i = 1, x_t^A, x_t^B)}{p(z_t^A, z_t^B | m_i = 0, x_t^A, x_t^B)} \tag{24}$$

$$= R_{i,t-1} \frac{p(z_t^A | m_i = 1, x_t^A)}{p(z_t^A | m_i = 0, x_t^A)} \frac{p(z_t^B | m_i = 1, x_t^B)}{p(z_t^B | m_i = 0, x_t^B)} \tag{25}$$

In other words, (25) indicates that $R_{i,t}$ defined by conditioning the occupancy probabilities with sensor measurements from both robots, decouples into the product of terms, where each term corresponds to a separate robot. Overall, (25) yields $$l_{i,t} = \log R_{i,t} = l_{i,t}^A + l_{i,t}^B \tag{26}$$

That is, the log odd ratio of a grid cell is given by the sum of the log odd ratios corresponding to that grid cell and evaluated by each robot separately. In other words, the map merging process, performed over two maps from a sampled particle pair from particle sets of two robots at an encounter, comprises of updating the log odd ratio of each grid cell with the sum of the corresponding log odd ratios, given by the two maps.

In the case each map provides a raw value of the probability of occupancy of a grid cell i, the updated occupancy probability of the grid cell i is $$\tilde{p}_{i,t} = \frac{p_{i,t}^A p_{i,t}^B}{(1 - p_{i,t}^A)(1 - p_{i,t}^B) + p_{i,t}^A p_{i,t}^B}, \quad (27)$$

where $p_{i,t}^{A/B}$ is the raw occupancy probability of the grid cell i, estimated by robot A/B based on its sensor measurements up to time t.

Exemplar Implementation

Figure 7A:
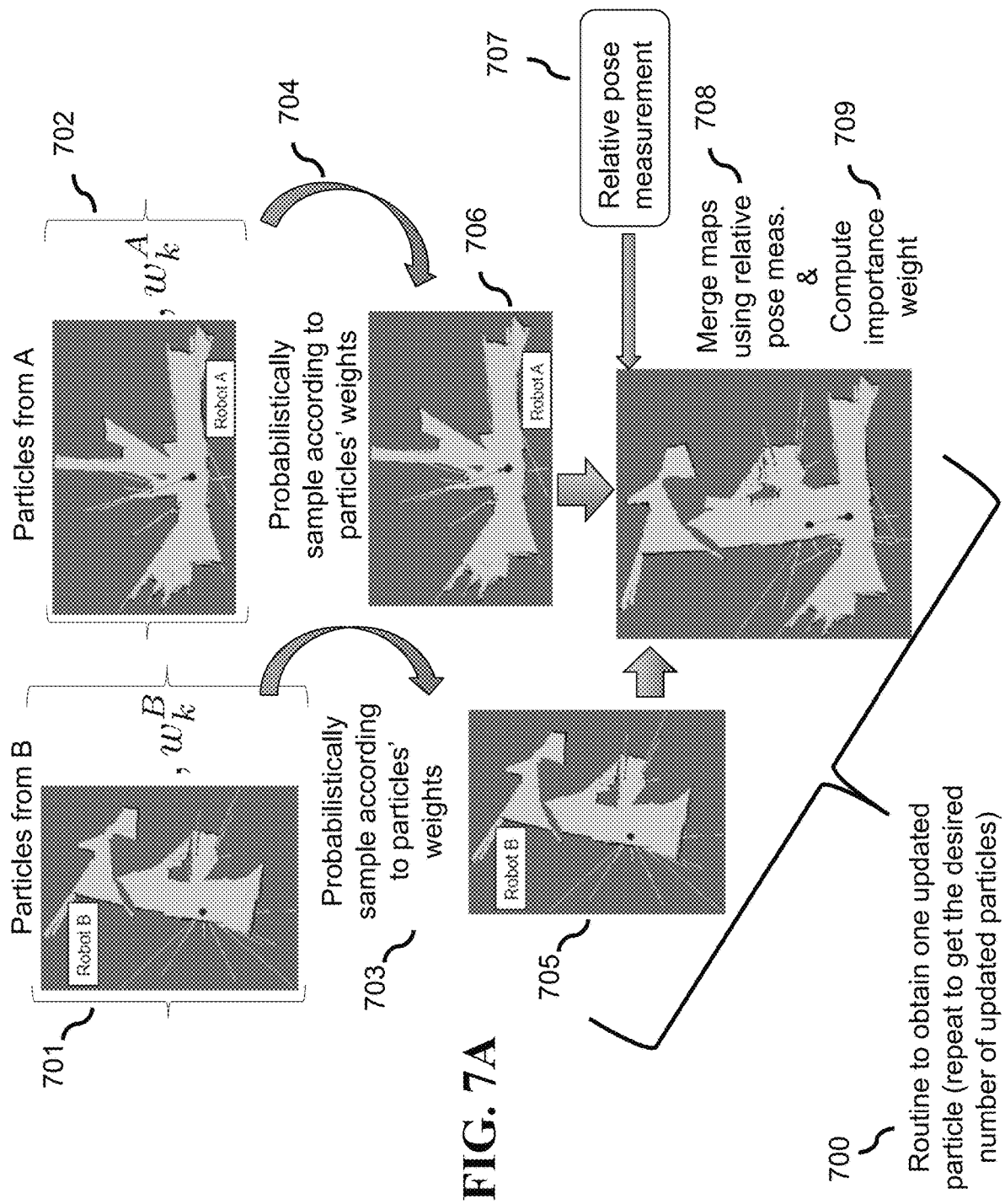
FIG. 7A shows an illustration a cooperative SLAM according to one embodiment.

FIG. 7A shows an illustration a cooperative SLAM according to one embodiment. Two robots exchange their SLAM particle sets at an encounter and have access to the measurement of their relative pose. The routine to obtain one updated particle 700 is executed on each robot in a decentralized manner and repeated to get the desired number of particles. As explained, the particle set from robot B 701 includes some number of particles, where each particle is one hypothesis of map and its pose in the map, along with the importance weight of that hypothesis. Similarly, the particle set of robot A 702 consists of a certain number of map/pose hypotheses along with their weights. In one embodiment of the disclosed method, a particle 705 is probabilistically sampled 703 from the set of particles corresponding to robot B, according to their weights. Analogously, a particle 706 is probabilistically sampled 704 from the set of particles originating from robot A, also according to their weights. Given a map/pose hypothesis from robot B, a map/pose hypothesis from robot A and the relative pose measurement 707, the corresponding maps are merged to obtain merged map 708 and the weight of the merged map is computed 709.

Figure 7B:
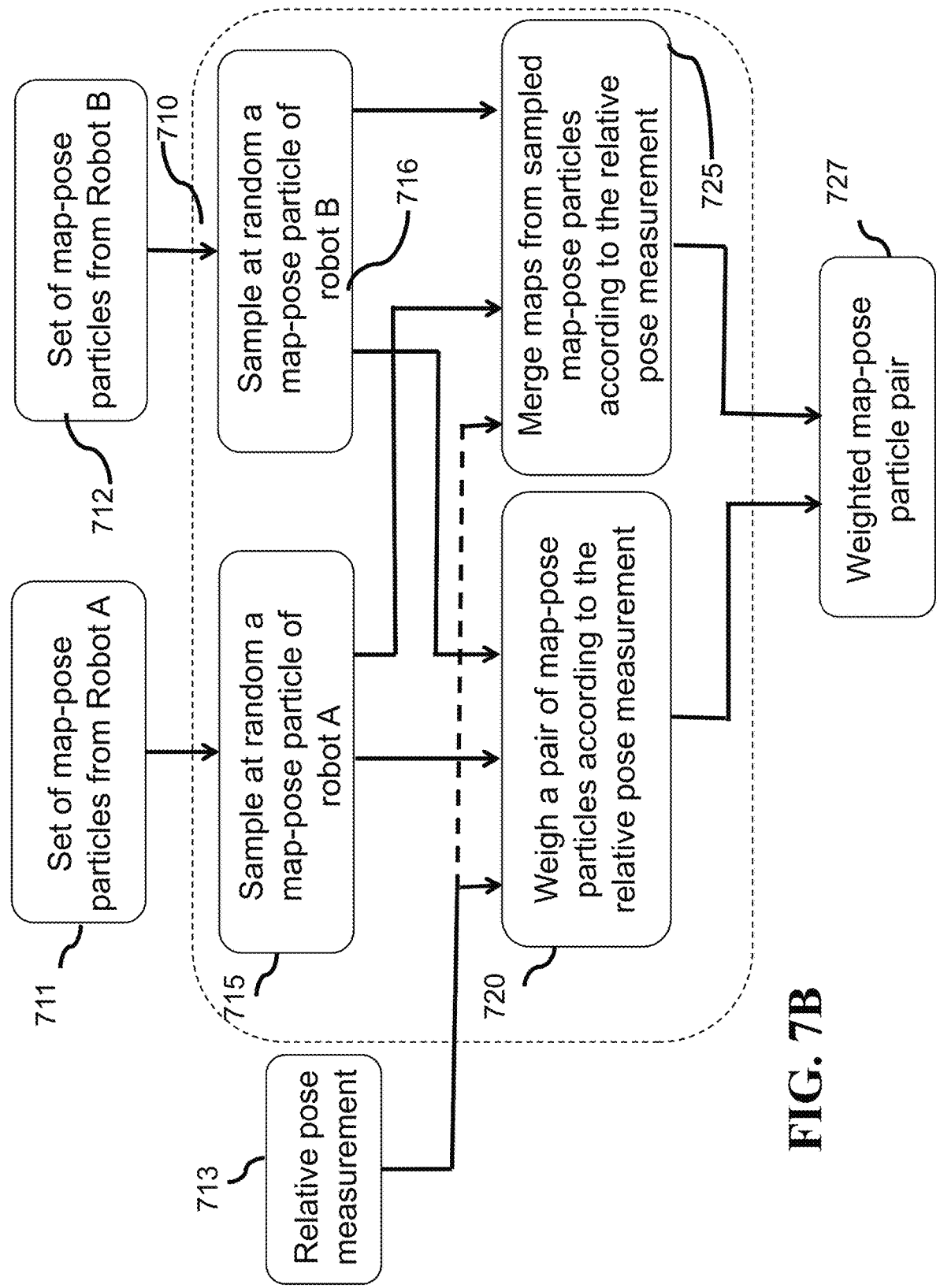
FIG. 7B shows a principle block diagram of one of the embodiments of the cooperative SLAM.

FIG. 7B shows a principle block diagram of one of the embodiments of the cooperative SLAM. The inputs to the method 710 are set of map-pose particles from robot A 711, set of map-pose particles from robot B 712 and the relative pose measurement 713. Particles from robot A are randomly sampled according to their weights 715. Analogously, particles from robot B are randomly sampled according to their weights 716. The maps from a pair of sampled particles from robot A and robot B are merged 725 using the corresponding poses and relative pose measurement. Each pair of particles from robots A and B are weighed 720. The method outputs weighted map-pose particles 727.

The weight associated with each output particle representing one hypothesis of a merged map and robots' poses in that map, is equal to the reciprocal of the number of particles K. That is, referring to FIG. 7A, the computation of importance weights 709 yields 1/K. Referring to block diagram in FIG. 7B, the weight of each merged map-pose particle 702 is computed to be 1/K.

In another embodiment of the disclosed method, the particle with the highest importance weight is extracted from the set of particles $\mathcal{P}^A$ originating from robot A. Similarly, the highest weight particle from the set $\mathcal{P}^B$ originating from robot B is also extracted. The poses from those two particles, denoted $p_t^A$ and $p_t^B$ are used in the map merging procedure. Note that the subscript t refers to time of the encounter between robots A and B.

Figure 8:
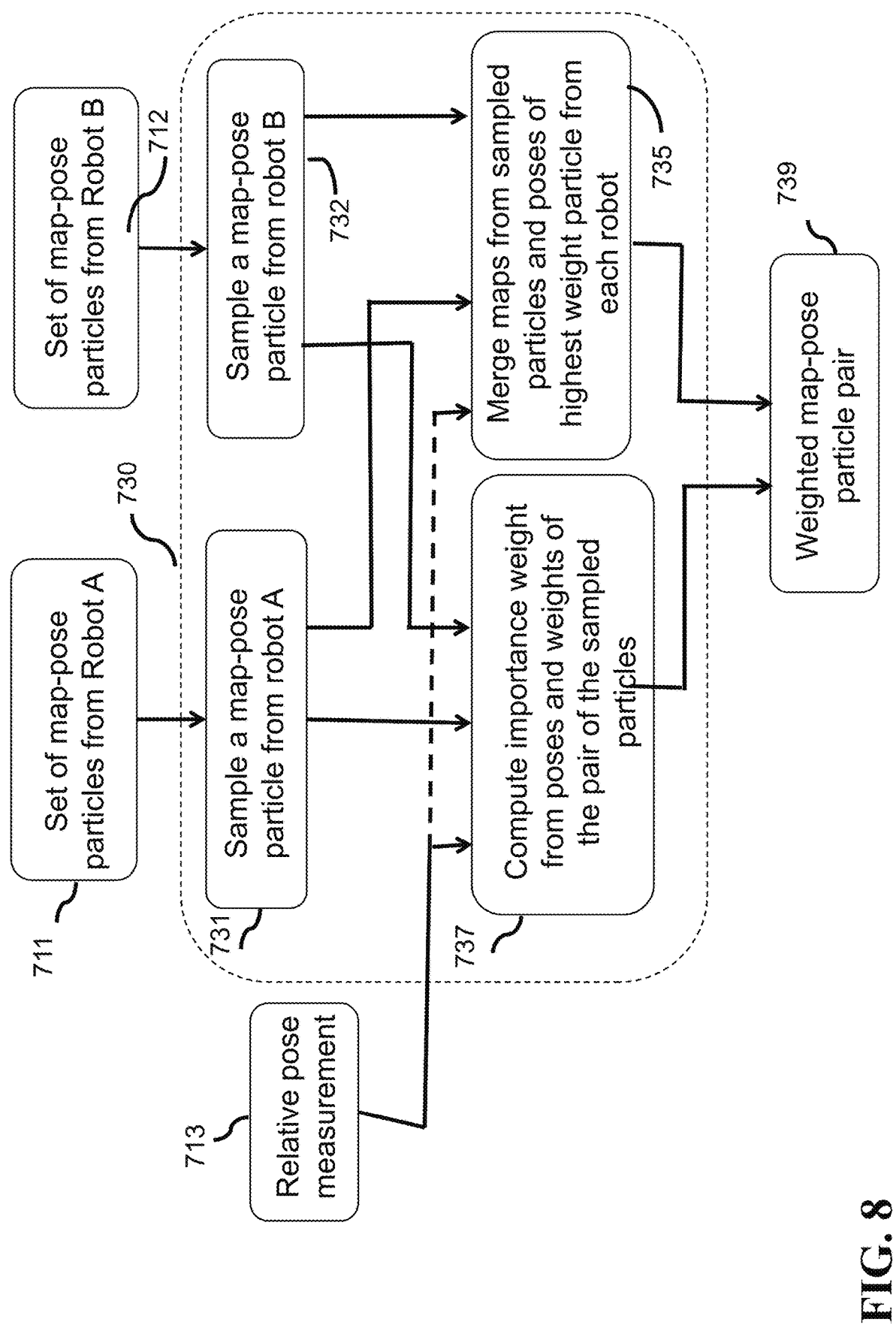
FIG. 8 shows a principle block diagram of the cooperative SLAM according to another embodiment.

FIG. 8 shows a principle block diagram of the cooperative SLAM according to another embodiment. Given the sets of single-robot SLAM particles corresponding to robot A 711 and robot B 712, a pair of particles is sampled, where each component in the pair is sampled from the corresponding set, according to particles' weights. That is, a particle is sampled 731 from the set of robot A's particles and is the first component in the pair of particles. Similarly, a particle is sampled 732 from the set of robot B's particles and is the second component in the pair of particles. The maps from the components in the pair of particles are merged 735 based on the relative pose measurement 713 and highest poses $p_t^A$ and $p_t^B$. That is, the maps from those particles are merged by applying rotation and translation necessary to align highest weight poses $p_t^A$ and $p_t^B$ with the measured relative pose between robots. The importance weight of the merged map is computed as the likelihood of the measured relative pose given the merged map and poses from the sampled particles 731 and 732 using (5), (9) or some other model. The overall weight 737 is computed as the product between the weight of the merged map and weights of the sampled particles 731 and 732. The resulting particle 739 comprises of the merged map, poses from the sampled particles 731 and 732, and the overall weight. The described procedure 730 generates one particle to represent a hypothesis of the map and robots' poses in the map upon their encounter. This routine is executed K times until the desired number of particles K is generated. The resulting weights of those K particles are then normalized so as to sum up to one.

Pseudo-Random Sampling

The disclosed methods embed random sampling with repetitions of SLAM particles according to a discrete distribution given by their weights. Assuming L particles, we denote this distribution with vector z such that its l-th entry $z_l$ denotes the probability of selecting the l-th particle. We note that $\Sigma_{l=1}^{L} z_l = 1$ and remark that sampling with repetitions means that the same particle can be sampled multiple times.

Figure 9A:
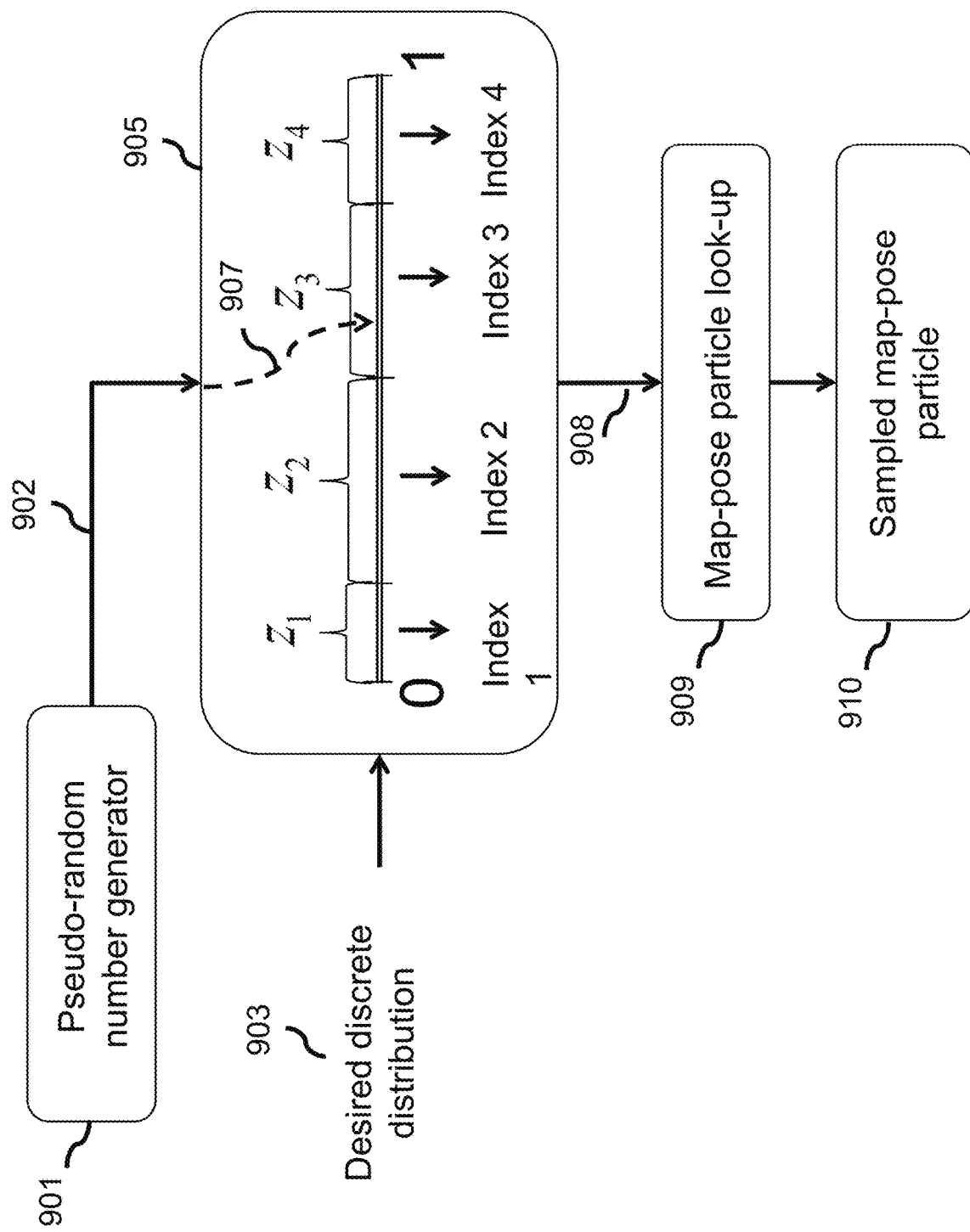
FIG. 9A is a principle block diagram of pseudo-random particle sampling according to some embodiments.

FIG. 9A is a principle block diagram of pseudo-random particle sampling according to some embodiments. Some embodiments use the pseudo-random particle sampling to implement particle sampling for a given discrete distribution z. Without loss of generality, assume in FIG. 9A that L=4 such that the desired discrete distribution 903 has entries $z_1$, $z_2$, $z_3$, $z_4$. The pseudo-random number generator 901 uniformly at random samples a number between 0 and 1 such that each number in that range is equally likely to be picked up. An index of a sampled particle is determined 905 based on the desired discrete distribution 903 and the pseudo-random number 902. In doing so, the range between 0 and 1 is divided according to the desired discrete distribution into L=4 segments of lengths $z_1$, $z_2$, $z_3$ and $z_4$, and the sampled index is the index of the segment where the pseudo-random number 902 lands 907. As shown in FIG. 9A, the pseudo-random number 902 is between $z_1+z_2$ and $z_1+z_2+z_3$ and, consequently, the output 908 from 905 is index 3. In general, the output 908 is an integer between 1 and L that goes onto pose particle look-up 909. The particle with such an index is delivered as a sampled pose particle 910. The described particle sampling implementation is used in 715 and 716 (FIG. 7B), as well as in 731 and 732 (FIG. 8).

Figure 9B:
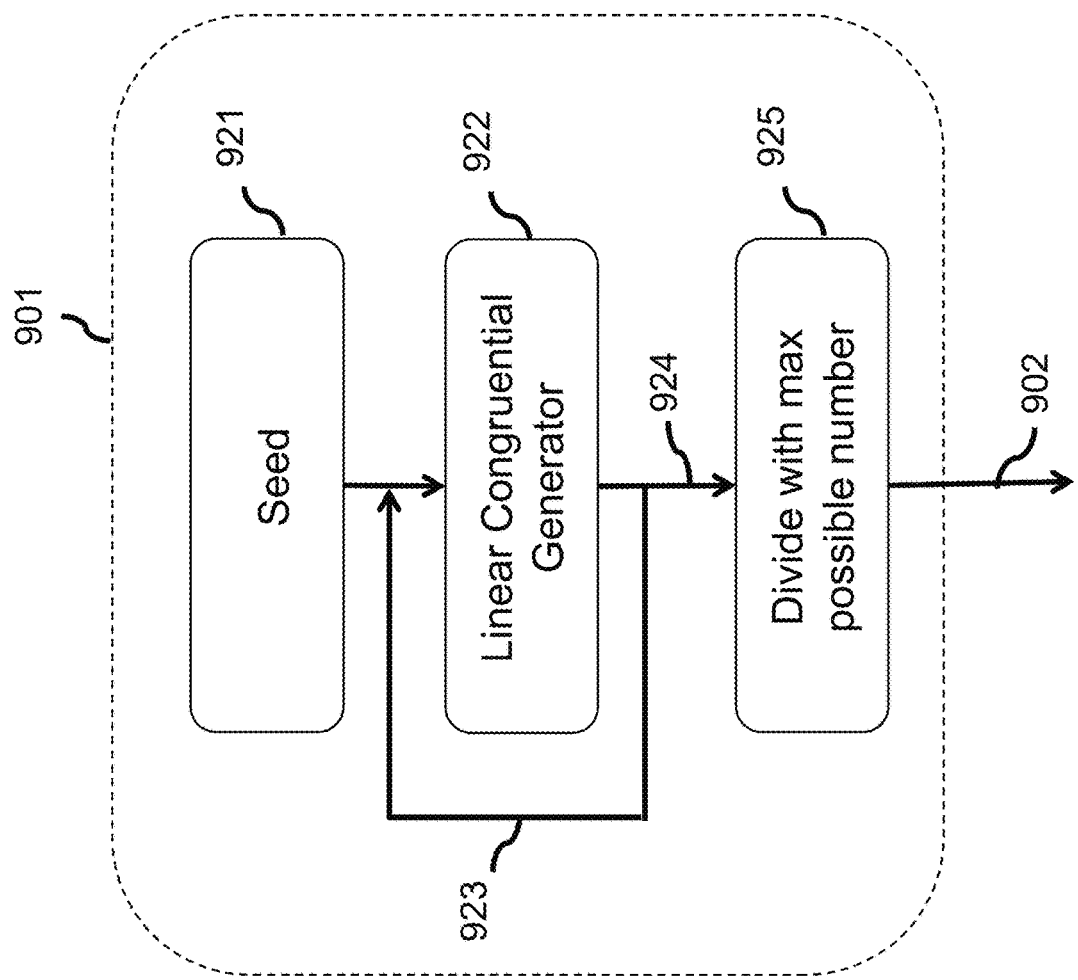
FIG. 9B shows a principle block diagram of pseudo-random number generation for sampling a pose particle according to one embodiment.

FIG. 9B shows a principle block diagram of pseudo-random number generation for sampling a pose particle according to one embodiment. In general, the output of this block should be a purely random number between 0 and 1, where each number from this range is equally likely to be sampled. Since the implementation of the random number generator in a processor is deterministic, the output from this block cannot be purely random. In fact, the output from the random number generator is deterministic. However, the device is designed such that in a long run, the sequence it produces resembles a sequence of random numbers. For those reasons, the random number generator is commonly referred to as a pseudo-random number generator. As used herein, "resembles" means that the generated sequence approximately satisfies two properties that a purely random and infinitely long sequence coining out from a random number generator would satisfy. The first property is related to having the generated numbers abide with uniform distribution, meaning that the histogram of the generated numbers is flat. The second property is related to having the generated numbers be unrelated to each other, which translates to having the normalized autocorrelation of the sequence be delta function (equal to one at zero lag and zero at all non-zero lags).

One way to generate pseudo-random numbers is illustrated in FIG. 9B. The crux of the method is a linear congruential generator (LCG) 922 which generates a sequence of pseudo-random integers according to $$y_n = a y_{n-1} + b \bmod m \tag{20}$$

where $y_n$ is the n-th number in the sequence, a, b and m are fixed scalars, while mod denotes a modulus operation which yields the remainder of the division of $ay_{n-1}+b$ with m. Thus, $y_n$ can be any integer between 0 and m−1. Commonly, m is the largest integer than can be stored in the processor.

The first entry in the sequence, $y_1$, is generated based on $y_0$ which is provided by the pre-fixed seed 921. For n>1, $y_n$ is generated based on $y_{n-1}$ such that $y_{n-1}$ needs to be stored and fed back 923. Each entry in the sequence of pseudo-random integers 924 is divided by m 925 to yield a sequence 902 of pseudo-random numbers between 0 and 1.

Other methods may be used to generate a sequence of pseudo-random numbers. For example, more outputs $y_{n-k}$, k>0 can be fed back to generate $y_n$ using congruence relation.

Multiple Measurements of Relative Pose between Robots

As explained above, robots measure their relative pose when they meet. The relative pose measurement may be a single measurement made by only one robot and communicated to the other. Alternatively, each robot may measure the relative pose and share the measurements with the other robot. As yet another alternative and more general case, each robot may perform multiple relative pose measurements and exchange them with the other robot. As a result, each robot may have M relative pose measurements $r_1, r_2, \ldots, r_M$. Assuming the robots do not move while M measurements have been taken and that multiple pose measurements are conditionally independent given robots' poses $x_t^A$ and $x_t^B$ and the map m, the likelihood of the measurements is given by $$p(r_1, r_2, \ldots, r_M | x_t^A, x_t^B, m) = \pi_{m=1}^M p(r_m | x_t^A, x_t^B, m),$$

where $p(r_m | x_t^A, x_t^B, m)$ is evaluated from the relative pose measurement model such as one in (5) or (9).

Multiple Encounters of Two Robots

Two robots continue on their own upon the encounter following higher level instructions depending on the task they are executing. Given that they may meet again, a natural question arises as to how to update SLAM particles at their following encounters. In general, the same methods apply. However, if two robots meet two or more times in a relatively short time interval, using the described method may lead to fusing the same information multiple times. The resulting SLAM particles then shrink more than they should, resulting in over-confident map and pose estimates. To ensure this does not happen, the robots do not perform information fusion unless one or both have traversed at least a certain, application-dependent, distance. By allowing robots exchange and fuse information only after traversing a certain distance, we ensure that the amount of new information the robots have collected since their last encounter is large enough to avoid obtaining severely over-confident map and pose estimates.

Encounters of Multiple Robots

The disclosed methods are scalable to cooperative SLAM of more than two robots. Namely, suppose robot A first meets robot B, moves a bit and then meets robot C. In such a scenario, robot A first updates its SLAM particles based on the information it receives from robot B and performs single robot SLAM until it meets robot C. Then robot A updates its most recent SLAM particles using the information it receives from robot C.

Similarly, assume robots A, B and C meet at the same time. In such a case, robot A first updates its SLAM particles based on the information it receives from one of the robots, for example, robot B. Then, robot A updates its most recent SLAM particles based on the information it receives from the other robot, for example robot C. Other robots proceed with updating their SLAM particles in a similar way.

Figure 10:
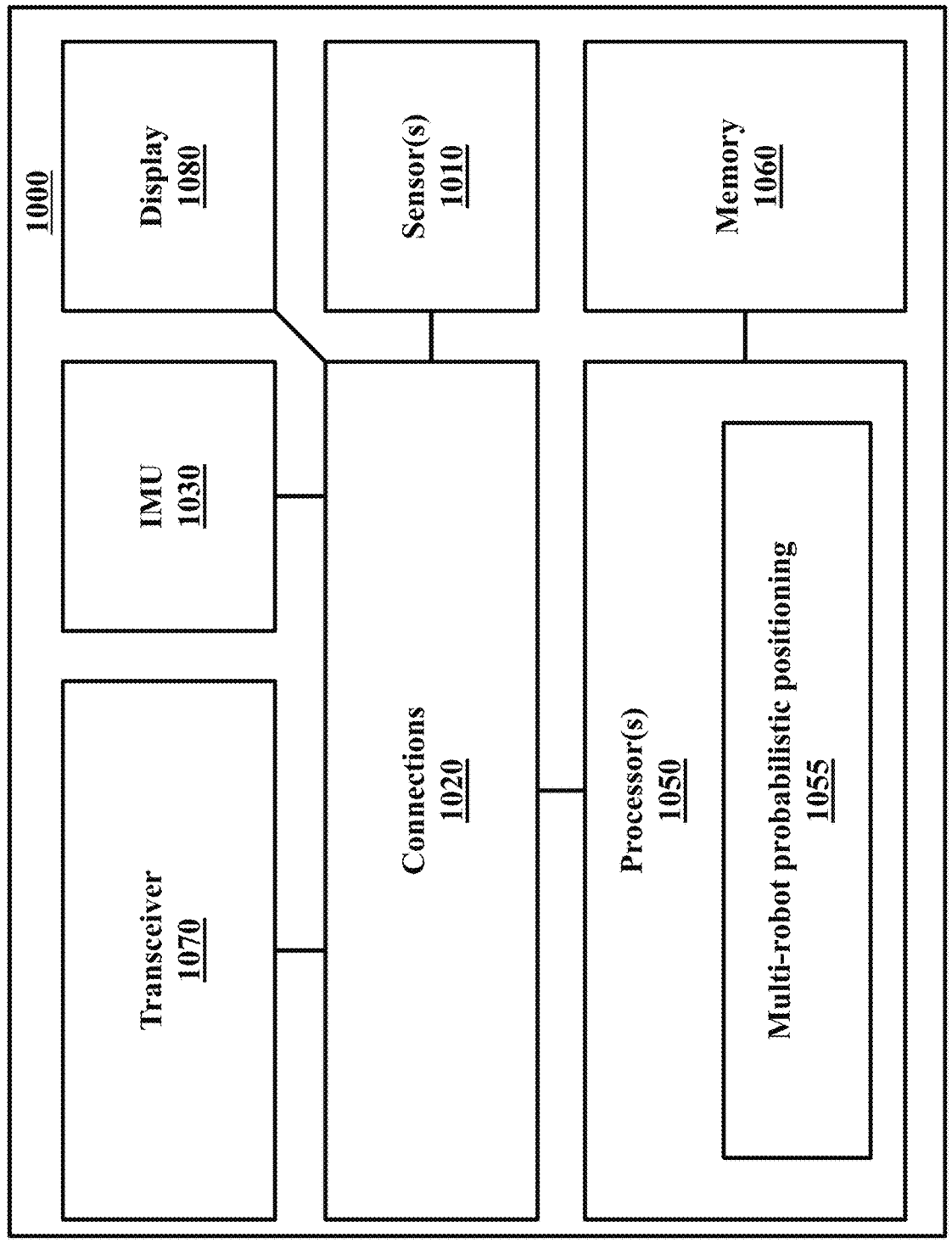
FIG. 10 shows a block diagram of a positioning system 1000 of a robot according to some embodiments.

FIG. 10 shows a block diagram of a positioning system 1000 of a robot according to some embodiments. The system 1000 can be implemented internal to the robot A and/or B. Additionally or alternatively, the system 1000 can be communicatively connected to the robot A and/or B.

The system 1000 can include one or combination of a camera 1010, an inertial measurement unit (IMU) 1030, a processor 1050, a memory 1060, a transceiver 1070, and a display/screen 1080, which can be operatively coupled to other components through connections 1020. The connections 1020 can comprise buses, lines, fibers, links or combination thereof.

The transceiver 1070 can, for example, include a transmitter enabled to transmit one or more signals over one or more types of wireless communication networks and a receiver to receive one or more signals transmitted over the one or more types of wireless communication networks. The transceiver 1070 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 400 can also include one or more ports for communicating over wired networks.

In some embodiments, the system 1000 can comprise image sensors such as CCD or CMOS sensors, lasers and/or camera 1010, which are hereinafter referred to as "sensor 1010". For example, the sensor 1010 can convert an optical image into an electronic or digital image and can send acquired images to processor 1050. Additionally, or alternatively, the sensor 1010 can sense the light reflected from a target object in a scene and submit the intensities of the captured light to the processor 1050.

For example, the sensor 1010 can include color or grayscale cameras, which provide "color information." The term "color information" as used herein refers to color and/or grayscale information. In general, as used herein, a color image or color information can be viewed as comprising 1 to N channels, where N is some integer dependent on the color space being used to store the image. For example, an RGB image comprises three channels, with one channel each for Red, Blue and Green information.

For example, the sensor 1010 can include a depth sensor for providing "depth information." The depth information can be acquired in a variety of ways using depth sensors. The term "depth sensor" is used to refer to functional units that may be used to obtain depth information independently and/or in conjunction with some other cameras. For example, in some embodiments, the depth sensor and the optical camera can be part of the sensor 1010. For example, in some embodiments, the sensor 1010 includes RGBD cameras, which may capture per-pixel depth (D) information when the depth sensor is enabled, in addition to color (RGB) images.

As another example, in some embodiments, the sensor 1010 can include a 3D Time Of Flight (3DTOF) camera. In embodiments with 3DTOF camera, the depth sensor can take the form of a strobe light coupled to the 3DTOF camera, which can illuminate objects in a scene and reflected light can be captured by a CCD/CMOS sensor in the sensor 1010. Depth information can be obtained by measuring the time that the light pulses take to travel to the objects and back to the sensor.

As a further example, the depth sensor can take the form of a light source coupled to the sensor 1010. In one embodiment, the light source projects a structured or textured light pattern, which can include one or more narrow bands of light, onto objects in a scene. Depth information is obtained by exploiting geometrical distortions of the projected pattern caused by the surface shape of the object. One embodiment determines depth information from stereo sensors such as a combination of an infra-red structured light projector and an infra-red camera registered to a RGB camera.

In some embodiments, the sensor 1010 includes stereoscopic cameras. For example, a depth sensor may form part of a passive stereo vision sensor, which may use two or more cameras to obtain depth information for a scene. The pixel coordinates of points common to both cameras in a captured scene may be used along with camera pose information and/or triangulation techniques to obtain per-pixel depth information.

In some embodiments, the system 1000 can be operatively connected to multiple sensors 1010, such as dual front cameras and/or a front and rear-facing cameras, which may also incorporate various sensors. In some embodiments, the sensors 1010 can capture both still and video images. In some embodiments, the sensor 1010 can include RGBD or stereoscopic video cameras capable of capturing images at, e.g., 30 frames per second (fps). In one embodiment, images captured by the sensor 1010 can be in a raw uncompressed format and can be compressed prior to being processed and/or stored in memory 1060. In some embodiments, image compression can be performed by the processor 1050 using lossless or lossy compression techniques.

In some embodiments, the processor 1050 can also receive input from IMU 1030. In other embodiments, the IMU 1030 can comprise 3-axis accelerometer(s), 3-axis gyroscope(s), and/or magnetometer(s). The IMU 1030 can provide velocity, orientation, and/or other position related information to the processor 1050. In some embodiments, the IMU 1030 can output measured information in synchronization with the capture of each image frame by the sensor 1010. In some embodiments, the output of the IMU 1030 is used in part by the processor 1050 to fuse the sensor measurements and/or to further process the fused measurements.

The system 1000 can also include a screen or display 1080 rendering images, such as color and/or depth images. In some embodiments, the display 1080 can be used to display live images captured by the sensor 1010, fused images, augmented reality (AR) images, graphical user interfaces (GUIs), and other program outputs. In some embodiments, the display 1080 can include and/or be housed with a touchscreen to permit users to input data via some combination of virtual keyboards, icons, menus, or other GUIs, user gestures and/or input devices such as styli and other writing implements. In some embodiments, the display 1080 can be implemented using a liquid crystal display (LCD) display or a light emitting diode (LED) display, such as an organic LED (OLED) display. In other embodiments, the display 480 can be a wearable display. In some embodiments, the result of the fusion can be rendered on the display 1080 or submitted to different applications that can be internal or external to the system 1000.

Exemplary system 1000 can also be modified in various ways in a manner consistent with the disclosure, such as, by adding, combining, or omitting one or more of the functional blocks shown. For example, in some configurations, the system 1000 does not include the IMU 1030 or the transceiver 1070. Further, in certain example implementations, the system 1000 include a variety of other sensors (not shown) such as an ambient light sensor, microphones, acoustic sensors, ultrasonic sensors, laser range finders, etc. In some embodiments, portions of the system 400 take the form of one or more chipsets, and/or the like.

The processor 1050 can be implemented using a combination of hardware, firmware, and software. The processor 1050 can represent one or more circuits configurable to perform at least a portion of a computing procedure or process related to sensor fusion and/or methods for further processing the fused measurements. The processor 1050 retrieves instructions and/or data from memory 1060. The processor 1050 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

The memory 1060 can be implemented within the processor 1050 and/or external to the processor 1050. As used herein the term "memory" refers to any type of long term, short term, volatile, nonvolatile, or other memory and is not to be limited to any particular type of memory or number of memories, or type of physical media upon which memory is stored. In some embodiments, the memory 1060 holds program codes that facilitate the multi-robot probabilistic positioning 1055.

For example, the memory 1060 can store the measurements of the sensors, such as still images, depth information, video frames, program results, as well as data provided by the IMU 1030 and other sensors. The memory 1060 can store a memory storing a geometry of the robot, a map of the space, a kinematic model of the robot, and a dynamic model of the robot. In general, the memory 1060 can represent any data storage mechanism. The memory 1060 can include, for example, a primary memory and/or a secondary memory. The primary memory can include, for example, a random access memory, read only memory, etc. While illustrated in FIG. 4 as being separate from the processors 1050, it should be understood that all or part of a primary memory can be provided within or otherwise co-located and/or coupled to the processors 1050.

Secondary memory can include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory can be operatively receptive of, or otherwise configurable to a non-transitory computer-readable medium in a removable media drive (not shown). In some embodiments, the non-transitory computer readable medium forms part of the memory 1060 and/or the processor 1050.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A robot for performing simultaneous localization and mapping (SLAM), comprising:
    a set of sensors for measuring movements of the robot in an environment and sensing occupied locations in the environment to produce sensor measurements;
    a processor configured to execute a SLAM module that processes the sensor measurements by a particle filter to produce a set of particles, each particle including a map of the environment and a pose of the robot in the environment to represent a probability that the environment has the map oriented with respect to the pose of the robot; and
    a receiver configured to receive a set of particles of a neighboring robot, wherein the processor, in response to receiving the set of particles of the neighboring robot, is configured to update maps of probabilistically sampled particles of the robot with maps of probabilistically sampled particles of the neighboring robot, wherein the update includes merging a map of the sampled particle of the robot with a map of the sampled particle of the neighboring robot roto-translated based on a relative pose between the robot and the neighboring robot; wherein the processor is configured to output one or a combination of a current map of the robot and a current pose of the robot in the current map determined based on the particles of the robot, wherein the processor is configured to request the neighboring robot to transmit its particles upon detecting a rendezvous with the neighboring robot when a distance between the rendezvous and a previous rendezvous is above a threshold.

2. The robot of claim 1, wherein the updated particles of the robot are probabilistically sampled according to their probabilities maintained by the particle filter.

3. The robot of claim 1, wherein the processor is configured to sample a first particle from the set of particles of the robot based on a weight of the first particle maintained by the robot and sample a second particle from the set of particles of the neighboring robot based on a weight of the second particle maintained by the neighboring robot, rotate and translate the map of the second particle based on the relative pose between the robot and the neighboring robot and merge the map of the first particle with the rotated map of the second particle.

4. The robot of claim 3, wherein the processor merges the map of the first particle of the robot with the map of the second particle of the neighboring robot by computing a log odd ratio of a grid cell in the merged map by summing corresponding log odd ratios from the map of the first particle and the map of the second particle.

5. The robot of claim 3, wherein the particle filter maintains a weight for each particle to represent the probability of the environment to have occupancy grid points of the map of the particle oriented with respect to the pose of the robot of the particle, wherein the processor is configured to pair the first particle and the second particle by sampling the set of particles of the robot and the set of particles of the neighboring robot according to the weights of the particles.

6. The robot of claim 4, wherein the particles have equal weights and the processor uniformly randomly samples the particles of the robot to pair particles.

7. The robot of claim 4, wherein the processor samples the particles of the robot non-uniformly randomly according to the weights of the particles, such that a particle with a larger weight is more likely to be sampled than a particle with a smaller weight.

8. The robot of claim 1, wherein the map in a particle of the robot is determined in a first coordinate system aligned with the pose of the robot in the particle, such that the movement of the robot causes the movement of the first coordinate system, wherein the map in a particle of the neighboring robot is determined in a second coordinate system aligned with the pose of the neighboring robot in the particle, such that the movement of the neighboring robot causes the movement of the second coordinate system, wherein the processor roto-translates one or a combination of the map in the particle of the robot and the map in the particle of the neighboring robot to align the first and the second coordinate systems.

9. The robot of claim 8, wherein the processor merges a map of a first particle of the robot with a map of a second particle of the neighboring robot using the first coordinate system of the first particle and the second coordinate systems of the second particle.

10. The robot of claim 8, wherein the processor merges a map of a first particle of the robot with a map of a second particle of the neighboring robot using the first coordinate system of a particle of the robot with the largest weight among the particles of the robot and the second coordinate systems of a particle of the neighboring robot with the largest weight among the particles of the neighboring robot.

11. The robot of claim 10, wherein the processor updates the weight of the first particle based on an error between an alignment transformation of the first and the second coordinate systems of the first and the second particles and an alignment transformation of the first and the second coordinate systems of the particles with the largest weights among the particles of the robot and the particles of the neighboring robot.

12. The robot of claim 1, wherein the processor determines one or a combination of the current map and the current pose of the robot as a weighted combination of the maps and the poses of the particles weighted with the corresponding weights of the particles of the robot.

13. The robot of claim 1, wherein the set of sensors include an odometer to measure a distance traveled by the robot, and a depth sensor to measure a distance between the robot and an occupied location in the environment.

14. The robot of claim 1, wherein the SLAM module uses a grid-based FastSLAM method to estimate the particles.

15. The robot of claim 14, wherein the grid-based FastSLAM uses a Bayesian inference framework to infer a probability distribution of a map m and robot's pose $x_t$ in the map at time t, given all ranging and odometry measurements up to time t.

16. The robot of claim 1, wherein the distance is one or a combination of a time passed since the previous rendezvous, and a distance covered by the robot since the previous rendezvous.

17. A method for performing simultaneous localization and mapping (SLAM), wherein the method uses a processor coupled with stored instructions implementing the method, wherein the instructions, when executed by the processor carry out steps of the method, comprising:
   measuring movements of the robot in an environment and sensing occupied locations in the environment to produce sensor measurements;
   processing the sensor measurements by a particle filter to produce a set of particles, each particle including a map of the environment and a pose of the robot in the environment to represent a probability that the environment has the map oriented with respect to the pose of the robot;
   receiving a set of particles of a neighboring robot and updating, in response to receiving the set of particles of the neighboring robot, maps of probabilistically sampled particles of the robot with maps of probabilistically sampled particles of the neighboring robot, wherein the updating includes merging a map of the sampled particle of the robot with a map of the sampled particle of the neighboring robot roto-translated based on a relative pose between the robot and the neighboring robot; and
   outputting one or a combination of a current map of the robot and a current pose of the robot in the current map determined based on the particles of the robot, wherein the processing and the updating include:
   sampling a first particle from the set of particles of the robot based on a weight of the first particle maintained by the robot;
   sampling a second particle from the set of particles of the neighboring robot based on a weight of the second particle maintained by the neighboring robot;
   rotating and translating the map of the second particle based on the relative pose between the robot and the neighboring robot; and
   merging the map of the first particle with the rotated map of the second particle by computing a log odd ratio of a grid cell in the merged map by summing corresponding log odd ratios from the map of the first particle and the map of the second particle.

18. A non-transitory computer-readable storage medium embodied thereon a program executable by a processor for performing a method, the method comprising:
   measuring movements of the robot in an environment and sensing occupied locations in the environment to produce sensor measurements;
   processing the sensor measurements by a particle filter to produce a set of particles, each particle including a map of the environment and a pose of the robot in the environment to represent a probability that the environment has the map oriented with respect to the pose of the robot;
   receiving a set of particles of a neighboring robot and updating, in response to receiving the set of particles of the neighboring robot, maps of probabilistically sampled particles of the robot with maps of probabilistically sampled particles of the neighboring robot, wherein the updating includes merging a map of the sampled particle of the robot with a map of the sampled particle of the neighboring robot roto-translated based on a relative pose between the robot and the neighboring robot; and
   outputting one or a combination of a current map of the robot and a current pose of the robot in the current map determined based on the particles of the robot, wherein the processing and the updating include:
   sampling a first particle from the set of particles of the robot based on a weight of the first particle maintained by the robot;
   sampling a second particle from the set of particles of the neighboring robot based on a weight of the second particle maintained by the neighboring robot;
   rotating and translating the map of the second particle based on the relative pose between the robot and the neighboring robot; and
   merging the map of the first particle with the rotated map of the second particle, wherein the particle filter maintains a weight for each particle to represent the probability of the environment to have occupancy grid points of the map of the particle oriented with respect to the pose of the robot of the particle, wherein the processor is configured to pair the first particle and the second particle by sampling the set of particles of the robot and the set of particles of the neighboring robot according to the weights of the particles.

19. A robot for performing simultaneous localization and mapping (SLAM), comprising:
   a set of sensors for measuring movements of the robot in an environment and sensing occupied locations in the environment to produce sensor measurements;
   a processor configured to execute a SLAM module that processes the sensor measurements by a particle filter to produce a set of particles, each particle including a map of the environment and a pose of the robot in the environment to represent a probability that the environment has the map oriented with respect to the pose of the robot; and
   a receiver configured to receive a set of particles of a neighboring robot, wherein the processor, in response to receiving the set of particles of the neighboring robot, is configured to update maps of probabilistically sampled particles of the robot with maps of probabilistically sampled particles of the neighboring robot, wherein the update includes merging a map of the sampled particle of the robot with a map of the sampled particle of the neighboring robot roto-translated based on a relative pose between the robot and the neighboring robot;

wherein the processor is configured to output one or a combination of a current map of the robot and a current pose of the robot in the current map determined based on the particles of the robot, wherein the SLAM module uses a grid-based FastSLAM method to estimate the particles, and wherein the grid-based FastSLAM uses a Bayesian inference framework to infer a probability distribution of a map m and robot's pose $x_t$ in the map at time t, given all ranging and odometry measurements up to time t.

20. A robot for performing simultaneous localization and mapping (SLAM), comprising:

a set of sensors for measuring movements of the robot in an environment and sensing occupied locations in the environment to produce sensor measurements;

a processor configured to execute a SLAM module that processes the sensor measurements by a particle filter to produce a set of particles, each particle including a map of the environment and a pose of the robot in the environment to represent a probability that the environment has the map oriented with respect to the pose of the robot; and a receiver configured to receive a set of particles of a neighboring robot, wherein the processor, in response to receiving the set of particles of the neighboring robot, is configured to update maps of probabilistically sampled particles of the robot with maps of probabilistically sampled particles of the neighboring robot, wherein the update includes merging a map of the sampled particle of the robot with a map of the sampled particle of the neighboring robot roto-translated based on a relative pose between the robot and the neighboring robot;

wherein the processor is configured to determine one or a combination of the current map and the current pose of the robot as a weighted combination of the maps and the poses of the particles weighted with the corresponding weights of the particles of the robot and output one or a combination of a current map of the robot and a current pose of the robot in the current map determined based on the particles of the robot.

* * * * *